US006339486B1

(12) United States Patent
Popovich

(10) Patent No.: US 6,339,486 B1
(45) Date of Patent: Jan. 15, 2002

(54) HOLOGRAPHIC TECHNIQUE FOR ILLUMINATION OF IMAGE DISPLAYS USING AMBIENT ILLUMINATION

(75) Inventor: Milan M. Popovich, Leicester (GB)

(73) Assignee: DigiLens, Inc., Sunnyvale, CA (US)

( * ) Notice: Subject to any disclaimer, the term of this patent is extended or adjusted under 35 U.S.C. 154(b) by 0 days.

(21) Appl. No.: 09/419,273

(22) Filed: Oct. 15, 1999

Related U.S. Application Data

(60) Provisional application No. 60/104,473, filed on Oct. 16, 1998.

(51) Int. Cl.[7] .................................................. G02B 5/32
(52) U.S. Cl. ........................ 359/15; 359/1; 359/22; 359/32; 348/832; 348/40; 348/41; 353/31
(58) Field of Search .................. 359/1, 15, 22, 359/3, 4, 32; 348/40, 41, 343, 832; 353/31

(56) References Cited

U.S. PATENT DOCUMENTS

| | | |
|---|---|---|
| 3,807,829 A | 4/1974 | Close |
| 4,028,725 A | 6/1977 | Lewis .......................... 358/103 |
| 4,458,981 A | 7/1984 | Huignard |
| 4,500,163 A | 2/1985 | Burns et al. |
| 4,566,031 A | 1/1986 | Kirk |
| 4,669,812 A | 6/1987 | Hoebing |
| 4,759,596 A | 7/1988 | Po et al. |
| 4,790,613 A | 12/1988 | Moss |
| 4,799,739 A | 1/1989 | Newswanger |
| 4,807,951 A | 2/1989 | Moss |
| 4,830,441 A | 5/1989 | Chang |
| 4,834,473 A | 5/1989 | Keyes, IV et al. |
| 4,834,476 A | 5/1989 | Benton |

(List continued on next page.)

FOREIGN PATENT DOCUMENTS

| | | | |
|---|---|---|---|
| DE | 34 190 98 A1 | 11/1985 | ........... G02B/27/22 |
| EP | 0 389 123 A3 | 9/1990 | ........... G03B/21/56 |
| EP | 0 389 123 A2 | 9/1990 | ........... G03B/21/56 |

(List continued on next page.)

OTHER PUBLICATIONS

Bunning, T. J. et al., "The Morphology and Performance of Holographic Transmission Gratings Recorded in Polymer Dispersed Liquid Crystals," Polymer vol. 36, No. 14, received Dec. 27, 1994; revised Feb. 10, 1995, pp. 2699–2708.

(List continued on next page.)

*Primary Examiner*—Darren Schuberg
*Assistant Examiner*—Craig Curtis
(74) *Attorney, Agent, or Firm*—Skjerven Morrill MacPherson LLP

(57) ABSTRACT

An apparatus and method is disclosed for illuminating an image display with ambient light using holographic techniques. The apparatus includes a pair of holographic optical elements each having a first surface aligned on a common axis so that the first surfaces of each optical element face each other. Each of the first and second optical elements diffracts first bandwidth light. The second holographic optical element, however, diffracts first bandwidth light received on the first surface facing the first surface of the first holographic optical element. The second holographic optical element diffracts first bandwidth light received on its first surface, the diffracted light emerging from the first surface. The first and second holographic optical elements are switchable between inactive and active states. In the inactive state, each of the first and second holographic optical elements transmits substantially all light without substantial alteration. However, in the active state, each of the first and second holographic elements diffracts a first bandwidth light. The first and second holographical elements record a hologram in a switchable holographic material. This material may be formed from a polymer dispersed liquid crystal material.

66 Claims, 23 Drawing Sheets

U.S. PATENT DOCUMENTS

| | | | |
|---|---|---|---|
| H738 H | 2/1990 | McManus et al. | |
| 4,932,731 A | 6/1990 | Suzuki et al. | |
| 4,938,568 A | 7/1990 | Margerum et al. | 350/334 |
| 4,981,332 A | 1/1991 | Smith et al. | |
| 4,993,790 A | 2/1991 | Vick | |
| 5,011,244 A | 4/1991 | Smith et al. | |
| 5,013,141 A | 5/1991 | Sakata | 350/348 |
| 5,014,709 A | 5/1991 | Bjelkhagen et al. | |
| 5,024,494 A | 6/1991 | Williams et al. | |
| 5,035,474 A | 7/1991 | Moss | |
| 5,036,385 A | 7/1991 | Eichenlaub et al. | |
| 5,044,709 A | 9/1991 | Smith et al. | |
| 5,071,209 A | 12/1991 | Chang | |
| 5,093,563 A | 3/1992 | Small et al. | |
| 5,093,567 A | 3/1992 | Staveley | 250/221 |
| 5,096,282 A | 3/1992 | Margerum et al. | 359/3 |
| 5,103,323 A | 4/1992 | Magarinos | |
| 5,111,313 A | 5/1992 | Shires | |
| 5,151,724 A | 9/1992 | Kikinis | |
| 5,153,670 A | 10/1992 | Jannson et al. | |
| 5,175,637 A | 12/1992 | Jones et al. | 359/48 |
| 5,221,957 A | 6/1993 | Jannson et al. | |
| 5,227,898 A | 7/1993 | Iavecchia et al. | |
| 5,234,449 A | 8/1993 | Bruker | 606/158 |
| 5,278,532 A | 1/1994 | Hegg et al. | |
| 5,291,314 A | 3/1994 | Agranar et al. | |
| 5,299,035 A | 3/1994 | Leith et al. | |
| 5,305,124 A | 4/1994 | Chern et al. | |
| 5,319,492 A | 6/1994 | Dorn et al. | |
| 5,331,149 A | 7/1994 | Spitzer et al. | 250/221 |
| 5,341,229 A | 8/1994 | Rowan | |
| 5,365,354 A | 11/1994 | Jannson et al. | |
| 5,379,133 A | 1/1995 | Kirk | |
| 5,381,253 A | 1/1995 | Sharp et al. | |
| 5,414,544 A | 5/1995 | Aoyagi et al. | 359/53 |
| 5,418,631 A | 5/1995 | Tedesco et al. | |
| 5,424,866 A | 6/1995 | Kikinis | |
| 5,440,428 A | 8/1995 | Hegg et al. | |
| 5,455,693 A | 10/1995 | Wreede et al. | 359/15 |
| 5,471,327 A | 11/1995 | Tedesco et al. | |
| 5,497,254 A | 3/1996 | Amako et al. | |
| 5,506,701 A | 4/1996 | Ichikawa | |
| 5,521,724 A | 5/1996 | Shires | |
| 5,530,565 A | 6/1996 | Owen | |
| 5,535,024 A | 7/1996 | Khoury et al. | |
| 5,537,232 A | 7/1996 | Biles | |
| 5,539,542 A | 7/1996 | Picoli et al. | |
| 5,539,544 A | 7/1996 | Le Paih et al. | |
| 5,544,143 A | 8/1996 | Kay et al. | |
| 5,552,912 A | 9/1996 | Sharp et al. | |
| 5,552,916 A | 9/1996 | O'Callaghan et al. | |
| 5,557,283 A | 9/1996 | Sheen et al. | |
| 5,561,537 A | 10/1996 | Aritake et al. | |
| 5,568,313 A | 10/1996 | Steenblick | |
| 5,570,139 A | 10/1996 | Wang | |
| 5,570,208 A | 10/1996 | Kato et al. | |
| 5,579,026 A | 11/1996 | Tabata | 345/8 |
| 5,581,378 A | 12/1996 | Kulick | |
| 5,589,956 A | 12/1996 | Morishima et al. | 359/15 |
| 5,589,957 A | 12/1996 | Aritake et al. | |
| 5,594,560 A | 1/1997 | Jelley et al. | |
| 5,606,455 A | 2/1997 | Eichenlaub | |
| 5,608,552 A | 3/1997 | Smith | |
| 5,615,023 A | 3/1997 | Yang | |
| 5,615,186 A | 3/1997 | Rosen et al. | |
| 5,617,225 A | 4/1997 | Aritake et al. | |
| 5,621,547 A | 4/1997 | Loiseaux et al. | |
| 5,629,784 A | 5/1997 | Abileah et al. | |
| 5,635,947 A | 6/1997 | Iwamoto | 345/7 |
| 5,640,256 A | 6/1997 | De Vré et al. | 359/3 |
| 5,644,369 A | 7/1997 | Jachimowicz et al. | 349/10 |
| 5,644,414 A | 7/1997 | Kato et al. | |
| 5,650,865 A | 7/1997 | Smith | |
| 5,668,648 A | 9/1997 | Saito et al. | |
| 5,680,231 A | 10/1997 | Grinberg et al. | |
| 5,682,214 A | 10/1997 | Amako et al. | 349/74 |
| 5,684,498 A | 11/1997 | Welch et al. | 345/8 |
| 5,692,077 A | 11/1997 | Stone et al. | |
| 5,696,552 A | 12/1997 | Aritake et al. | |
| 5,696,749 A | 12/1997 | Brazas et al. | |
| 5,698,343 A | 12/1997 | Sutherland et al. | |
| 5,703,702 A | 12/1997 | Crane et al. | |
| 5,706,067 A | 1/1998 | Colgan et al. | |
| 5,708,488 A | 1/1998 | Fukui et al. | |
| 5,709,463 A | 1/1998 | Igram | |
| 5,717,509 A | 2/1998 | Kato et al. | |
| 5,719,690 A | 2/1998 | Burland et al. | |
| 5,721,598 A | 2/1998 | Smith | |
| 5,721,630 A | 2/1998 | Horner et al. | |
| 5,729,366 A | 3/1998 | Yang et al. | |
| 5,736,958 A | 4/1998 | Turpin | |
| 5,739,930 A | 4/1998 | Sato et al. | |
| 5,744,267 A | 4/1998 | Meerholz et al. | |
| 5,745,203 A | 4/1998 | Valliath et al. | |
| 5,748,272 A | 5/1998 | Tanaka et al. | 349/86 |
| 5,748,828 A | 5/1998 | Steiner et al. | |
| 5,751,243 A | 5/1998 | Turpin | |
| 5,751,452 A | 5/1998 | Tanaka et al. | 359/52 |
| 5,757,522 A | 5/1998 | Kulick et al. | |
| 5,760,933 A | 6/1998 | Aritake et al. | |
| 5,764,317 A | 6/1998 | Sadovnik et al. | 349/5 |
| 5,768,242 A | 6/1998 | Juday | 369/103 |
| 5,771,320 A | 6/1998 | Stone | |
| 5,774,175 A | 6/1998 | Hattori | |
| 5,777,742 A | 7/1998 | Marron | |
| 5,777,760 A | 7/1998 | Hays et al. | |
| 5,784,181 A | 7/1998 | Louiseaux et al. | |
| 5,790,284 A | 8/1998 | Taniguchi et al. | |
| 5,793,503 A | 8/1998 | Haines et al. | |
| 5,793,504 A | 8/1998 | Stoll | |
| 5,796,498 A | 8/1998 | French | |
| 5,796,499 A | 8/1998 | Wenyon | |
| 5,801,793 A | 9/1998 | Faris et al. | |
| 5,801,798 A | 9/1998 | Chen et al. | |
| 5,801,799 A | 9/1998 | Chen et al. | |
| 5,808,589 A | 9/1998 | Fergason | 345/8 |
| 5,808,759 A | 9/1998 | Okamori et al. | |
| 5,808,800 A | 9/1998 | Handschy et al. | 359/630 |
| 5,815,222 A | 9/1998 | Matsuda et al. | |
| 5,822,029 A | 10/1998 | Davis et al. | |
| 5,825,340 A | 10/1998 | Torizuka et al. | 345/8 |
| 5,825,448 A | 10/1998 | Bos et al. | |
| 5,825,540 A | 10/1998 | Gold et al. | |
| 5,828,471 A | 10/1998 | Davis et al. | |
| 5,838,403 A | 11/1998 | Jannson et al. | |
| 5,844,709 A | 12/1998 | Rabinovich et al. | |
| 5,844,711 A | 12/1998 | Harrison | |
| 5,852,504 A | 12/1998 | Kato et al. | |
| 5,867,134 A | 2/1999 | Alvelda et al. | 345/8 |
| 5,875,012 A | 2/1999 | Crawford et al. | 349/74 |
| 5,880,883 A | 3/1999 | Sudo | 359/462 |
| 5,886,675 A | 3/1999 | Aye et al. | 345/7 |
| 5,942,157 A | 8/1999 | Sutherland et al. | |
| 5,959,704 A | 9/1999 | Suzuki et al. | 349/9 |
| 5,977,935 A | 11/1999 | Yasukawa et al. | 345/8 |
| 6,008,781 A | 12/1999 | Furness, III et al. | 345/8 |
| 6,023,253 A | 2/2000 | Taniguchi et al. | 345/7 |

FOREIGN PATENT DOCUMENTS

| | | | | |
|---|---|---|---|---|
| EP | 0 559 435 A1 | 9/1993 | | G11B/7/135 |
| EP | 0 602 813 A1 | 6/1994 | | D02B/5/32 |

| | | | | |
|---|---|---|---|---|
| EP | 0 664 495 A1 | 7/1995 | ............ | G03H/1/02 |
| EP | 0 720 040 A2 | 7/1996 | ......... | G02F/1/1335 |
| EP | 0 720 040 A3 | 4/1997 | ......... | G02F/1/1335 |
| EP | 0 777 136 A1 | 6/1997 | ............ | G02B/5/20 |
| EP | 0 785 457 A2 | 7/1997 | ......... | G02F/1/1333 |
| EP | 0 821 293 A2 | 1/1998 | ............ | G03H/1/04 |
| EP | 0 825 462 A1 | 2/1998 | ............ | G02B/5/32 |
| EP | 0 826 986 A1 | 3/1998 | ............ | G02B/5/20 |
| EP | 0 856 766 A2 | 8/1998 | ......... | G02F/1/1333 |
| EP | 0 856 768 A2 | 8/1998 | ......... | G02F/1/1347 |
| EP | 0 785 457 A3 | 10/1998 | ......... | G02F/1/1333 |
| EP | 0 821 293 A3 | 11/1998 | ............ | G03H/1/04 |
| EP | 0 856 766 A3 | 7/1999 | ......... | G02F/1/1333 |
| EP | 0 856 768 A3 | 8/1999 | ......... | G02F/1/1347 |
| FR | 2 610 733 A1 | 12/1988 | ........... | G02B/27/10 |
| GB | 2 259 213 A | 3/1993 | ............ | G09B/9/32 |
| JP | 3-84516 | 4/1991 | ........... | G02B/27/22 |
| JP | 10 54959 | 2/1998 | ........... | G02B/27/42 |
| WO | WO 94/18596 | 8/1994 | ........... | G02B/27/00 |
| WO | WO 95/04294 | 2/1995 | | |
| WO | WO 97/35223 | 9/1997 | ........... | G02B/27/01 |
| WO | WO 97/36206 | 10/1997 | ......... | G02F/1/1347 |
| WO | 98/04650 | 2/1998 | | |

OTHER PUBLICATIONS

Domash, Lawrence H. et al., "Applications of Switchable Polaroid Holograms," SPIE vol. 2152, Jun. 1, 1994, pp. 127–138.

Iwamoto, Kazuyo et al., "An Eye Movement Tracking Type Head Mounted Display for Virtual Reality System: Evaluation Experiments of a Proto–type System," IEEE, Feb. 10, 1994, pp. 13–18.

Iwamoto, Kazuyo et al., "High Resolution, Wide View Angle Head Mounted Display Using Eye Movement Tracking: System Structure and Evaluation Experiments," IEEE International Workshop on Robot and Human Communication, May 7, 1995, pp. 289–294.

Marrakchi, A. et al., "Generation of Programmable Coherent Source Arrays Using Spatial Light Modulators," Optics Letters, vol. 16, No. 12, Jun. 15, 1991, pp. 931–933.

Natarajan, L.V., et al., "Holographic PDLC's for Optical Beam Modulation, Deflection, and Dynamic Filter Applications," (Invited Paper), work performed at the Materials Directorate of the Air Force Research Laboratory at Wright–Patterson Air Force Base, 1998, pp. 44–51.

Patel, J. S. et al., "Electrically Controlled Polarization–independent Liquid–Crystal Fresnel Lens Arrays," Optics Letters, vol. 16, No. 7, Apr. 1, 1991, pp. 532–534.

Stankus, J. J., et al., "Electric–Field–Switchable Stratified Volume Holograms in Photorefractive Polymers," Optics Letters, vol. 19, No. 18, Sep. 15, 1994, pp. 1480–1482.

Sutherland, R. L., "Optics Limiters, Switches, and Filters Based on Poloymer Dispersed Liquid Crystals," SPIE, vol. 1080, Liquid Crystal Chemistry, Physics, and Applications, 1989, pp. 83–90.

Sutherland, R. L., et al., "Bragg Gratings in an Acrylate Polymer Consisting of Periodic Polymer–Dispersed Liquid–Crystal Planes," Chem. Mater., vol. 5, No. 10, 1993, pp. 1533–1538.

Sutherland, R. L., et al., Electrically Switchable Volume Gratings in Polymer–Dispersed Liquid Crystals, Applied Physics Letters, vol. 64, No. 9, Feb. 28, 1994, pp. 1074–1076.

Sutherland, R. L.,et al., "Switchable Holograms in New Photopolymer–Liquid Crystal Composite Materials," SPIE, vol. 2404, Mar. 1995, pp. 132–143.

Tam, Eddy C., et al., "Spatial–Light Modulator–Based Electro–Optical Imaging System," Applied Optics, vol. 31, No. 5, Feb. 10, 1992, pp. 578–579.

Tanaka, Keiji, et al., "Holographically Formed Liquid–Crystals/Polymer Device for Reflective Color Display," 2320 Journal of the Society for Information Display, No. 1, Apr. 1994, pp. 37–40.

SLANTED
TRANSMISSION

SLANTED
REFLECTION

LIGHT TRANSMITTED

LIGHT BLOCKED

TRANSMITTED

RETRO-REFLECTED

UNSWITCHED STATE

SWITCHED STATE

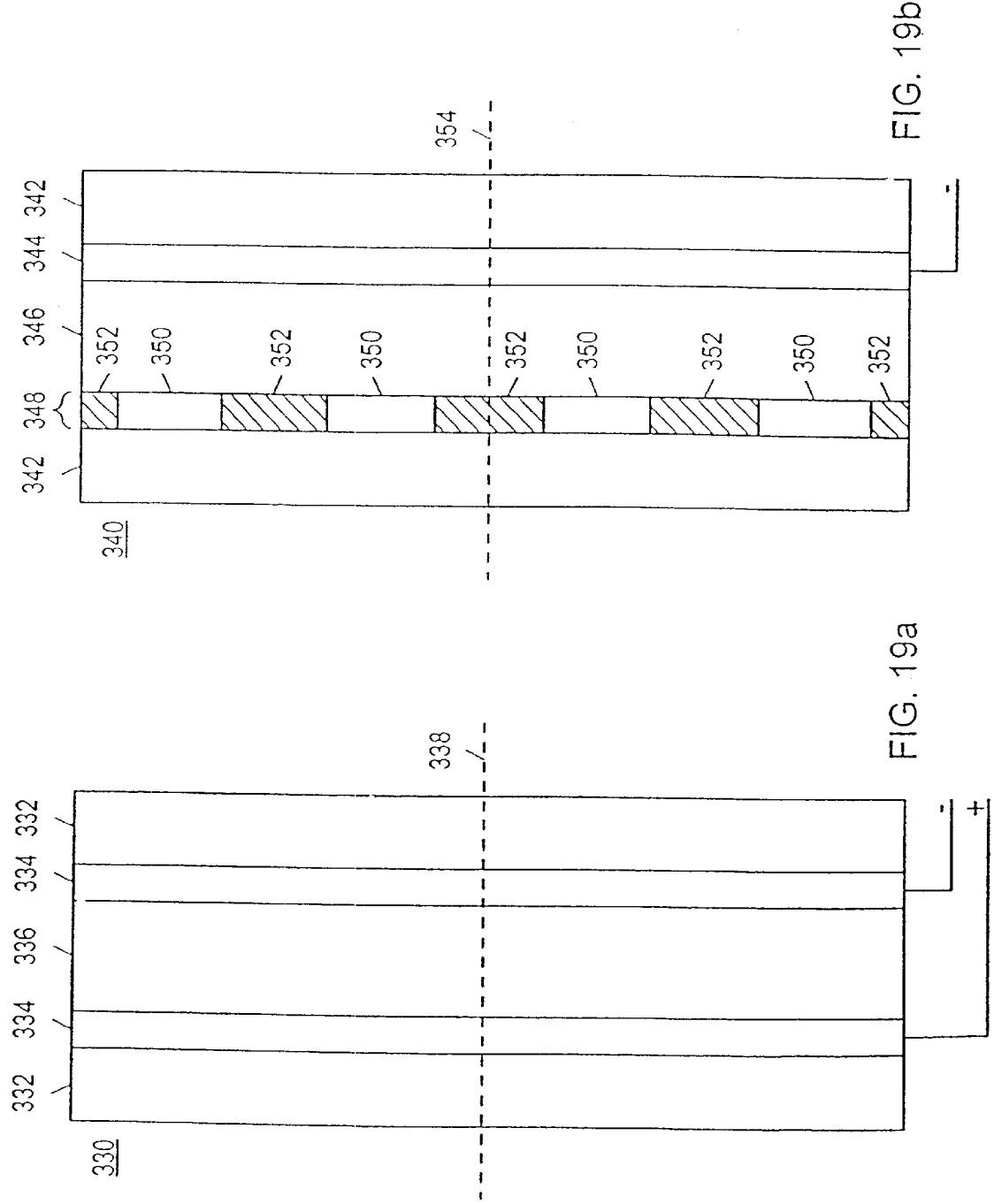

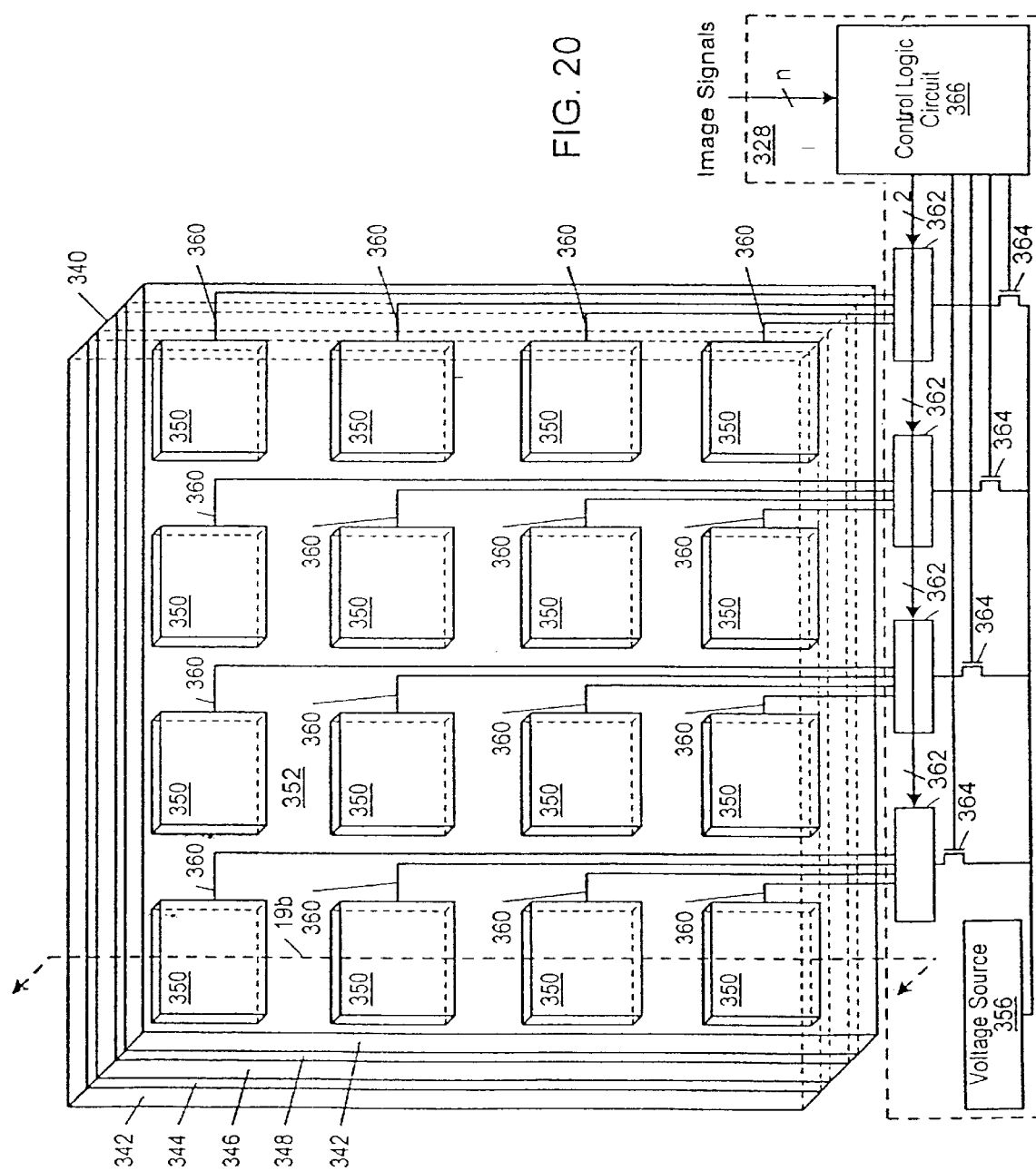

Diffracted angle as a function of incidence angle for a thin hologram

HOLOGRAPHIC TECHNIQUE FOR ILLUMINATION OF IMAGE DISPLAYS USING AMBIENT ILLUMINATION

RELATED APPLICATIONS

This application claims priority to provisional application entitled "HOLOGRAPHIC TECHNIQUE FOR ILLUMINATION OF A DIFFRACTIVE DISPLAY USING AMBIENT ILLUMINATION," Ser. No. 60/104,473, filed Oct. 16, 1998.

BACKGROUND OF THE INVENTION

1. Field of the Invention

The present invention generally relates to illumination of image displays, and more particularly to illumination of image displays using holographic techniques.

2. Description of the Relevant Art

Proper operation of image displays such as flat panel displays is in part dependent upon the optical character and intensity of light illuminating the display device. Under conditions of sufficient ambient light, operation of flat panel displays may be adequate. However, reduced ambient light may diminish suitable contrast to viewers of the display device. Such reduced contrast is addressed in the prior art by supplying an internal, supplemental light means to enhance illumination and make the display more viewable. However, the incorporation of -supplemental light sources adds bulk to the display and the system thereof and increases power requirements. Many image display systems are power sensitive. Conventional systems employing, for example, flat panel displays (e.g., laptop computers and cellular telephone displays) are sensitive to power budget constraints. In these systems, supplemental light sources for back lighting and edge lighting are often times the greatest source of power drain. The problem is to capture ambient light from as large an area as possible, (e.g., from a full hemispherical region), and channel the captured light into useful directions for illuminating an image display without the need for a supplemental source of illumination.

SUMMARY OF THE INVENTION

The present invention relates to an apparatus and method for illuminating an image display using ambient light. The present invention employs holographic techniques for collecting ambient light over a hemispherical region and redirecting the collective light into useful viewing directions.

In one embodiment, the apparatus of the present invention comprises at least a first pair of holographic optical elements each having a first surface aligned on a common axis. The first pair of holographic optical elements are themselves positioned such that the first surfaces of each face each other. The first holographic optical element of the first pair is configured to diffract a select portion of received ambient light. More particularly, the first holographic optical element is configured to diffract ambient light within a first bandwidth. The second optical element of the first pair is likewise configured to diffract a select portion of light received thereon. More particularly, the second holographic optical element is configured to diffract first bandwidth light which is received on the first surface thereof. This light after being diffracted by the second holographic optical element emerges from the first surface of the second optical element. Both the first and second holographic optical elements are also configured to transmit light, other than the first bandwidth light, without substantial alteration. Lastly, a quarter wave plate is positioned between and aligned with the first surfaces of the first and second optical elements.

In another embodiment, the second holographic optical element is switchable between active and inactive states. The second holographic optical element transmits first bandwidth light substantially unaltered when operating in its inactive state. In contrast, the second holographic optical element diffracts first bandwidth light received on the first surface when operating in the active state.

In yet another embodiment, the first holographic optical element is switchable between active and inactive states. In the inactive state, the first holographic optical element is configured to transmit first bandwidth light substantially unaltered. In the active state, the first holographic optical element diffracts first bandwidth light.

In still another embodiment, the first or second holographic optical element is formed from polymer dispersed liquid crystal material. In this embodiment, the polymer dispersed liquid crystal material undergoes phase separation during the hologram recording process, creating regions densely populated by liquid crystal micro-droplets, interspersed by regions of clear photopolymer.

In yet another embodiment, the second holographic optical element comprises a layer of material that records a hologram and an array of electrically conductive elements, wherein the array of electrically conductive elements is positioned adjacent the layer of material that records the hologram.

BRIEF DESCRIPTION OF THE DRAWINGS

Other objects and advantages of the invention will become apparent upon reading the following detailed description and upon reference to the accompanying drawings in which:

FIG. 19a is a cross-sectional view of one embodiment of a switchable holographic optical element employed in the systems shown in FIGS. 18a and 18b;

FIG. 19b is a cross-sectional view of one embodiment of the diffractive display employed in the system of FIG. 18b;

FIG. 20 is a diagram showing one embodiment of a holographic optical element employed in the diffractive display of FIG. 18b FIGS. 21a–21c a block diagrams showing operational aspects of one embodiment of the optical system shown in FIG. 18a;

Figure 1:
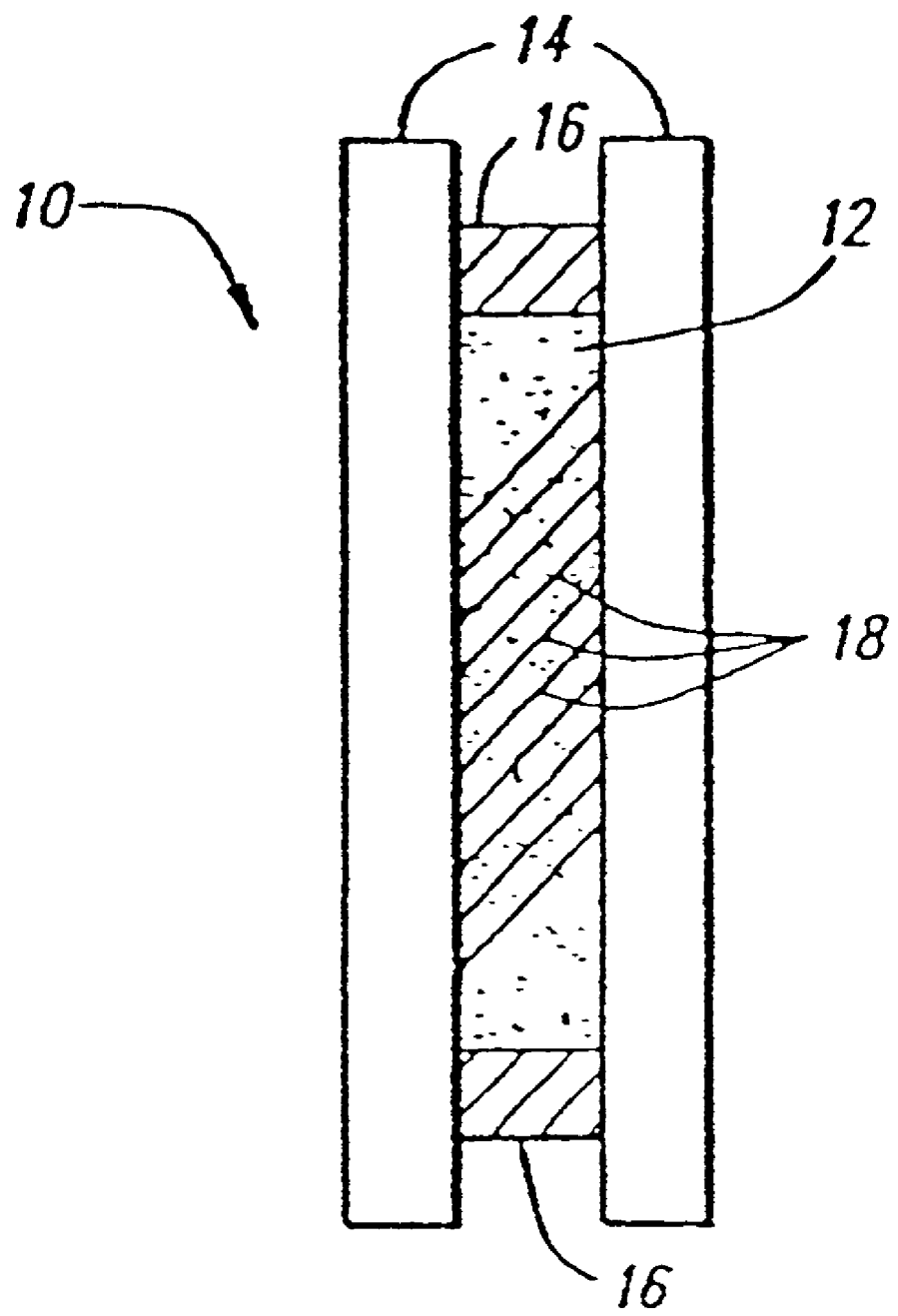
FIG. 1 is a cross-sectional of an electrically switchable hologram made of an exposed polymer dispersed liquid crystal (PDLC) material made in accordance with the teachings of the description herein.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

1. Switchable Hologram Materials And Devices

The present invention employs holographic optical elements formed, in one embodiment, from a polymer dispersed liquid crystal (PDLC) material comprising a monomer, a dispersed liquid crystal, a cross-linking monomer, a co-initiator and a photo-initiator dye. These PDLC materials exhibit clear and orderly separation of the liquid crystal and cured polymer, whereby the PDLC material advantageously provides high quality optical elements. The PDLC materials used in the holographic optical elements may be formed in a single step. The holographic optical elements may also use a unique photopolymerizable prepolymer material that permits in situ control over characteristics of resulting gratings, such as domain size, shape, density, ordering and the like. Furthermore, methods and materials taught herein can be used to prepare PDLC materials for optical elements comprising switchable transmission or reflection type holographic gratings.

Polymer dispersed liquid crystal materials, methods, and devices contemplated for use in the present invention are also described in R. L. Sutherland et al., "Bragg Gratings in an Acrylate Polymer Consisting of Periodic Polymer dispersed Liquid-Crystal Planes," *Chemistry of Materials*, No. 5, pp. 1533–1538 (1993); in R. L. Sutherland et al., "Electrically switchable volume gratings in polymer dispersed liquid crystals," *Applied Physics Letters*, Vol. 64, No. 9, pp. 1074–1076 (1994); and T. J. Bunning et al., "The Morphology and Performance of Holographic Transmission Gratings Recorded in Polymer dispersed Liquid Crystals," *Polymer*, Vol. 36, No. 14, pp. 2699–2708 (1995), all of which are fully incorporated by reference into this Detailed Description. U.S. patent application Ser. Nos. 08/273, 436 and U.S. Pat. No. 5,698,343 to Sutherland et al., titled "Switchable Volume Hologram Materials and Devices," and "Laser Wavelength Detection and Energy Dosimetry Badge," respectively, are also incorporated by reference and include background material on the formation of transmission gratings inside volume holograms.

The process by which a hologram for use in one embodiment of the present invention, may be formed is controlled primarily by the choice of components used to prepare the homogeneous starting mixture, and to a lesser extent by the intensity of the incident light pattern. In one embodiment of polymer dispersed liquid crystal (PDLC) material employed in the present invention creates a switchable hologram in a single step. A feature of one embodiment of PDLC material is that illumination by an inhomogeneous, coherent light pattern initiates a patterned, anisotropic diffusion (or counter diffusion) of polymerizable monomer and second phase material, particularly liquid crystal (LC). Thus, alternating well-defined channels of second phase-rich material, separated by well-defined channels of a nearly pure polymer, can be produced in a single-stop process.

The resulting embodiment of PDLC material may have an anisotropic spatial distribution of phase-separated LC droplets within the photochemically cured polymer matrix. Prior art PDLC materials made by a single-step process can achieve at best only regions of larger LC bubbles and smaller LC bubbles in a polymer matrix. The large bubble sizes are highly scattering which produces a hazy appearance and multiple ordering diffractions, in contrast to the well-defined first order diffraction and zero order diffraction made possible by the small LC bubbles of one embodiment of PDLC material in well-defined channels of LC-rich material. Reasonably well-defined alternately LC-rich channels, and nearly pure polymer channels in a PDLC material are possible by multistep processes, but such processes do not achieve the precise morphology control over LC droplet size and distribution of sizes and widths of the polymer and LC-rich channels made possible by one embodiment of PDLC material.

The same may be prepared by coating the mixture between two indium-tin-oxide (ITO) coated glass slides separated by spacers of nominally 10–20 $\mu$m thickness. The sample is placed in a conventional holographic recording setup. Gratings are typically recorded using the 488 nm line of an Argon ion laser with intensities of between about 0.1–100 mW/cm$^2$ and typical exposure times of 30–120 seconds. The angle between the two beams is varied to vary the spacing of the intensity peaks, and hence the resulting grating spacing of the hologram. Photopolymerization is induced by the optical intensity pattern. A more detailed discussion of exemplary recording apparatus can be found in R. L. Sutherland, et al., "Switchable holograms in new photopolymer-liquid crystal composite materials," Society of Photo-Optical Instrumentation Engineers (SPIE), Proceedings Reprint, Volume 2402, reprinted from *Diffractive and Holographic Optics Technology II* (1995), incorporated herein by reference.

The features of the PDLC material are influenced by the components used in the preparation of the homogeneous starting mixture and, to a lesser extent, by the intensity of the incident light pattern. In one embodiment, the prepolymer material comprises a mixture of a photopolymerizable monomer, a second phase material, a photo-initiator dye, a co-initiator, a chain extender (or cross-linker), and, optionally, a surfactant.

In one embodiment, two major components of the prepolymer mixture are the polymerizable monomer and the second phase material, which are preferably completely miscible. Highly functionalized monomers may be preferred because they form densely cross-linked networks which shrink to some extent and to end to squeeze out the second phase material. As a result, the second phase material is moved anisotropically out of the polymer region and, thereby, separated into well-defined polymer-poor, second phase-rich regions or domains. Highly functionalized monomers may also be preferred because the extensive cross-linking associated with such monomers yields fast kinetics, allowing the hologram to form relatively quickly, whereby the second phase material will exist in domains of less than approximately 0.1 $\mu$m.

Highly functionalized monomers, however, are relatively viscous. As a result, these monomers do not tend to mix well with other materials, and they are difficult to spread into thin films. Accordingly, it is preferable to utilize a mixture of penta-acrylates in combination with di-, tri-, and/or tetra-acrylates in order to optimize both the functionality and viscosity of the prepolymer material. Suitable acrylates, such as triethyleneglycol diacrylate, trimethylolpropane triacrylate, pentaerythritol triacrylate, pentaerythritol tetracrylate, pentaerythritol pentacrylate, and the like can be used in the present invention. In one embodiment, it has been found that an approximately 1:4 mixture of tri-to penta-acrylate facilitates homogeneous mixing while providing a favorable mixture for forming 10–20 $\mu$m films on the optical plates.

The second phase material of choice for use in the practice of the present invention is a liquid crystal (LC). This also allows an electro-optical response for the resulting hologram. The concentration of LC employed should be large enough to allow a significant phase separation to occur in the cured sample, but not so large as to make the sample opaque or very hazy. Below about 20% by weight very little phase separation occurs and diffraction efficiencies are low. Above about 35% by weight, the sample becomes highly scattering, reducing both diffraction efficiency and transmission. Samples fabricated with approximately 25% by weight typically yield good diffraction efficiency and optical clarity. In prepolymer mixtures utilizing a surfactant, the concentration of LC may be increased to 35% by weight without loss in optical performance by adjusting the quantity of surfactant. Suitable liquid crystals contemplated for use in the practice of the present invention may include the mixture of cyanobiphenyls marketed as E7 by Merck, 4'-n-pentyl-4-cyanobiphenyl, 4'-n-heptyl-4-cyanobiphenyl, 4'-octaoxy-4-cyanobiphenyl, 4'-pentyl-4-cyanoterphenyl, -methoxybenzylidene-4'-butylaniline, and the like. Other second phase components are also possible.

The polymer dispersed liquid crystal material employed in the practice of the present invention may be formed from a prepolymer material that is a homogeneous mixture of a polymerizable monomer comprising dipentaerythritol hydroxypentacrylate (available, for example, from Polysciences, Inc., Warrington, Pennsylvania), approximately 10–40 wt % of the liquid crystal E7 (which is a mixture of cyanobiphenyls marketed as E7 by Merck and also available from BDH Chemicals, Ltd., London, England), the chain-extending monomer N-vinylpyrrolidinone ("NVP") (available from the Aldrich Chemical Company, Milwaukee, Wis.), co-initiator N-phenylglycine ("NPG") (also available from the Aldrich Chemical Company, Milwaukee, Wis.), and the photo-initiator dye rose bengal ester; (2,4,5,7-tetraiodo-3',4', 5',6'-tetrachlorofluorescein-6-acetate ester) marketed as RBAX by Spectragraph, Ltd., Maumee, Ohio). Rose bengal is also available as rose bengal sodium salt (which must be esterified for solubility) from the Aldrich Chemical Company. This system has a very fast curing speed which results in the formation of small liquid crystal micro-droplets.

The mixture of liquid crystal and prepolymer material are homogenized to a viscous solution by suitable means (e.g., ultrasonification) and spread between indiumtin-oxide (ITO) coated glass sides with spacers of nominally 15–100 $\mu$m thickness and, preferably, 10–20 $\mu$m thickness. The ITO is electrically conductive and serves as an optically transparent electrode. Preparation, mixing and transfer of the prepolymer material onto the glass slides are preferably done in the dark, as the mixture is extremely sensitive to light.

The sensitivity of the prepolymer materials to light intensity is dependent on the photo-initiator dye and its concentration. A higher dye concentration leads to a higher sensitivity. In most cases, however, the solubility of the photo-initiator dye limits the concentration of the dye and, thus, the sensitivity of the prepolymer material. Nevertheless, it has been found that for more general applications, photoinitiator dye concentrations in the range of 0.2–0.4% by weight are sufficient to achieve desirable sensitivities and allow for a complete bleaching of the dye in the recording process, resulting in colorless final samples. Photo-initiator dyes that may be useful in generating PDLC materials are rose bengal ester (2,4,5,7-tetraiodo-3',4',5', 6'-tetrachlorofluorescein-6-acetate ester); rose bengal sodium salt; eosin; eosin sodium salt; 4,5-diiodosuccinyl fluorescein; camphorquinone; methylene blue, and the like. These dyes allow a sensitivity to recording wavelengths across the visible spectrum from nominally 400 nm to 700 nm. Suitable near-infrared dyes, such as cationic cyanine dyes with trialkylborate anions having absorption from 600–900 nm as well as merocyanine dyes derived from spiropyran may also find utility in the present invention.

The co-initiator employed in the practice of the present invention controls the rate of curing in the free radical polymerization reaction of the prepolymer material. Optimum phase separation and, thus, optimum diffraction efficiency in the resulting PDLC material, are a function of curing rate. It has been found that favorable results can be achieved utilizing co-initiator in the range of 2–3% by weight. Suitable co-initiators include N-phenylglycine; triethyl amine; triethanolamine; N,N-dimethyl-2,6-diisopropyl aniline, and the like.

Other suitable dyes and dye co-initiator combinations that may be suitable for use in the present invention, particularly for visible light, include eosin and triethanolamine; camphorquinone and N-phenylglycine; fluorescein and triethanolamine; methylene blue and triethanolamine or N-phenylglycine; erythrosin B and triethanolamine; indolinocarbocyanine and triphenyl borate; iodobenzospiropyran and triethylamine, and the like.

The chain extender (or cross linker) employed in the practice of the present invention may help to increase the solubility of the components in the prepolymer material as well as increase the speed of polymerization. The chain extender is preferably a smaller vinyl monomer as compared with the pentacrylate, whereby it can react with the acrylate positions in the pentacrylate monomer, which are not easily accessible to neighboring pentaacrylate monomers due to steric hindrance. Thus, reaction of the chain extender monomer with the polymer increases the propagation length of the growing polymer and results in high molecular weights. It has been found that chain extender in general applications in the range of 10–18% by weight maximizes the performance in terms of diffraction efficiency. In the one embodiment, it is expected that suitable chain extenders can be selected from the following: N-vinylpyrrolidinone; N-vinyl pyridine; acrylonitrile; N-vinyl carbazole, and the like.

It has been found that the addition of a surfactant material, namely, octanoic acid, in the prepolymer material lowers the switching voltage and also improves the diffraction efficiency. In particular, the switching voltage for PDLC materials containing a surfactant are significantly lower than those of a PDLC material made without the surfactant. While not wishing to be bound by any particular theory, it is believed that these results may be attributed to the weakening of the anchoring forces between the polymer and the phase-separated LC droplets. SEM studies have shown that droplet sizes in PDLC materials including surfactants are reduced to the range of 30–50 nm and the distribution is more homogeneous. Random scattering in such materials is reduced due to the dominance of smaller droplets, thereby increasing the diffraction efficiency. Thus, it is believed that the shape of the droplets becomes more spherical in the presence of surfactant, thereby contributing to the decrease in switching voltage.

For more general applications, it has been found that samples with as low as 5% by weight of surfactant exhibit a significant reduction in switching voltage. It has also been found that, when optimizing for low switching voltages, the concentration of surfactant may vary up to about 10% by weight (mostly dependent on LC concentration) after which there is a large decrease in diffraction efficiency, as well as an increase in switching voltage (possibly due to a reduction in total phase separation of LC). Suitable surfactants include octanoic acid; heptanoic acid; hexanoic acid; dodecanoic acid; decanoic acid, and the like.

In samples utilizing octanoic acid as the surfactant, it has been observed that the conductivity of the sample is high, presumably owing to the presence of the free carboxyl (COOH) group in the octanoic acid. As a result, the sample increases in temperature when a high frequency (~2 KHz) electrical field is applied for prolonged periods of time. Thus, it is desirable to reduce the high conductivity introduced by the surfactant, without sacrificing the high diffraction efficiency and the low switching voltages. It has been found that suitable electrically switchable gratings can be formed from a polymerizable monomer, vinyl neononanoate ("VN") $C_8H_{17}CO_2CH=CH_2$, commercially available from the Aldrich Chemical Co. in Milwaukee, Wis. Favorable results have also been obtained where the chain extender N-vinylpyrrolidinone ("NVP") and the surfactant octanoic acid are replaced by 6.5% by weight VN. VN also acts as a chain extender due to the presence of the reactive acrylate monomer group. In these variations, high optical quality samples were obtained with about 70% diffraction efficiency, and an applied field of 6V/$\mu$m could electrically switch the resulting gratings.

PDLC materials used in the present invention may also be formed using a liquid crystalline bifunctional acrylate as the monomer ("LC monomer"). The LC monomers have an advantage over conventional acrylate monomers due to their high compatibility with the low molecular weight nematic LC materials, thereby facilitating formation of high concentrations of low molecular weight LC and yielding a sample with high optical quality. The presence of higher concentrations of low molecular weight LCs in the PDLC material greatly lowers the switching voltages (e.g., to ~2V/µm). Another advantage of using LC monomers is that it is possible to apply low AC or DC fields while recording holograms to pre-align the host LC monomers and low molecular weight LC so that a desired orientation and configuration of the nematic directors can be obtained in the LC droplets. The chemical formulate of several suitable LC monomers are as follows:

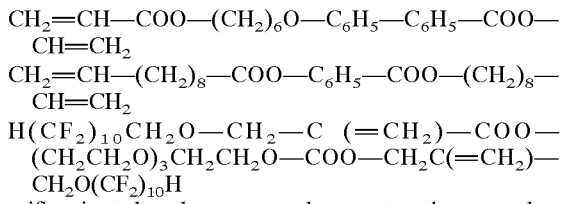

$CH_2=CH-COO-(CH_2)_6O-C_6H_5-C_6H_5-COO-CH=CH_2$ $CH_2=CH-(CH_2)_8-COO-C_6H_5-COO-(CH_2)_8-CH=CH_2$ $H(CF_2)_{10}CH_2O-CH_2-C(=CH_2)-COO-(CH_2CH_2O)_3CH_2CH_2O-COO-CH_2C(=CH_2)-CH_2O(CF_2)_{10}H$

Semifluorinated polymers are known to show weaker anchoring properties and also significantly reduced switching fields. Thus, it is believed that semifluorinated acrylate monomers which are bifunctional and liquid crystalline may find suitable application in the present invention.

Referring now to FIG. 1, there is shown a cross-sectional view of an electrically switchable hologram 10 made of an exposed polymer dispersed liquid crystal material made according to the teachings of this description. A layer 12 of the polymer dispersed liquid crystal material is sandwiched between a pair of indium-tin-oxide coated glass slides 14 and spacers 16. The interior of hologram 10 shows Bragg transmission gratings 18 formed when layer 12 was exposed to an interference pattern from two intersecting beams of coherent laser light. The exposure times and intensities can be varied depending on the diffraction efficiency and liquid crystal domain size desired. Varying the concentrations of photo-initiator, co-initiator and chain-extending (or cross-linking) agent can control liquid crystal domain size. The orientation of the nematic directors can be controlled while the gratings are being recorded by application of an external electric field across the ITO electrodes.

Figure 2:
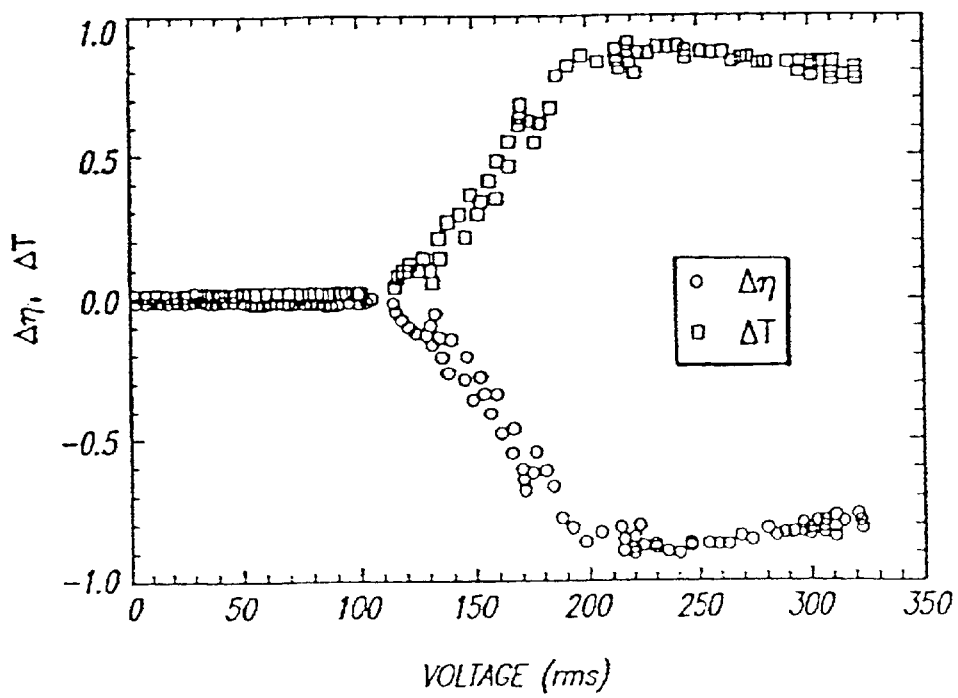
FIG. 2 is a graph of the normalized net transmittance and normalized net diffraction efficiency of a hologram made in accordance with the teachings of the description herein (without the addition of a surfactant) versus the rms voltage applied across the hologram.

The scanning electron micrograph shown in FIG. 2 of the referenced *Applied Physics Letters* article, and incorporated herein by reference, is of the surface of a grating which was recorded in a sample with a 36 wt % loading of liquid crystal using the 488 nm line of an argon ion laser at an intensity of 95 mW/cm$^2$. The size of the liquid crystal domains is about 0.2 µm and the grating spacing is about 0.54 µm. This sample, which is approximately 20 µm thick, diffracts light in the Bragg regime.

FIG. 2 is a graph of the normalized net transmittance and normalized net diffraction efficiency of a hologram made according to the teachings of his disclosure versus the root mean square voltage ("Vrms") applied across the hologram. $\Delta\eta$ is the change in first order Bragg diffraction efficiency. $\mu T$ is the change in zero order transmittance. FIG. 2 shows that energy is transferred from the first order beam to the zero-order beam as the voltage is increased. There is a true minimum of the diffraction efficiency at approximately 225 Vrms. The peak diffraction efficiency can approach 100%, depending on the wavelength and polarization of the probe beam, by appropriate adjustment of the sample thickness. The minimum diffraction efficiency can be made to approach 0% by slight adjustment of the parameters of the PDLC material to force the refractive index of the cured polymer to be equal to the ordinary refractive index of the liquid crystal.

Figure 3:
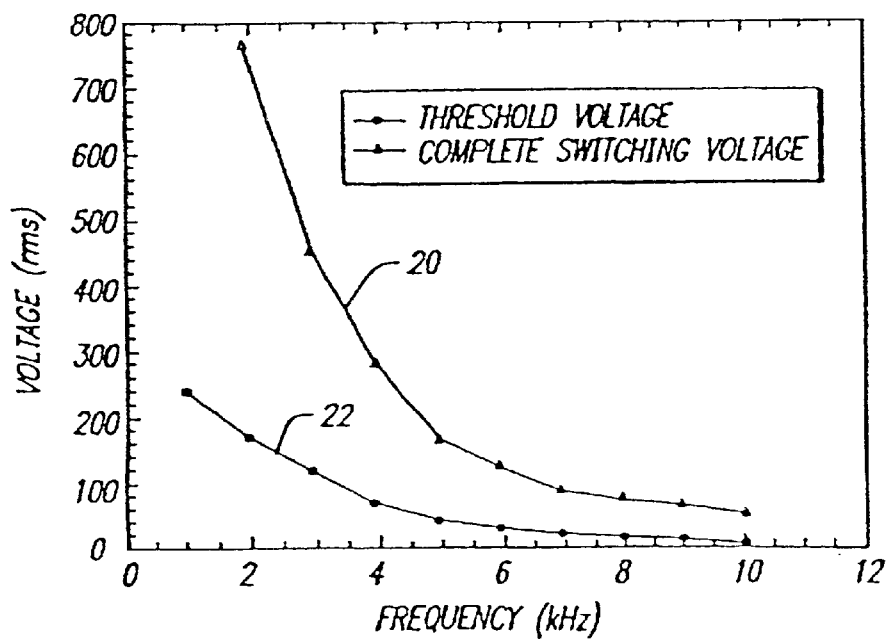
FIG. 3 is a graph of both the threshold and complete switching rms voltages needed for switching a hologram made in accordance with the teachings of the description herein to minimum diffraction efficiency versus the frequency of the rms voltage.

By increasing the frequency of the applied voltage, the switching voltage for minimum diffraction efficiency can be decreased significantly. This is illustrated in FIG. 3, which is a graph of both the threshold rms voltage 20 and the complete switching rms voltage 22 needed for switching a hologram made according to the teachings of this disclosure to minimum diffraction efficiency versus the frequency of the rms voltage. The threshold and complete switching rms voltages are reduced to 20 Vrms and 60 Vrms, respectively, at 10 kMz. Lower values are expected at even higher frequencies.

Figure 4:
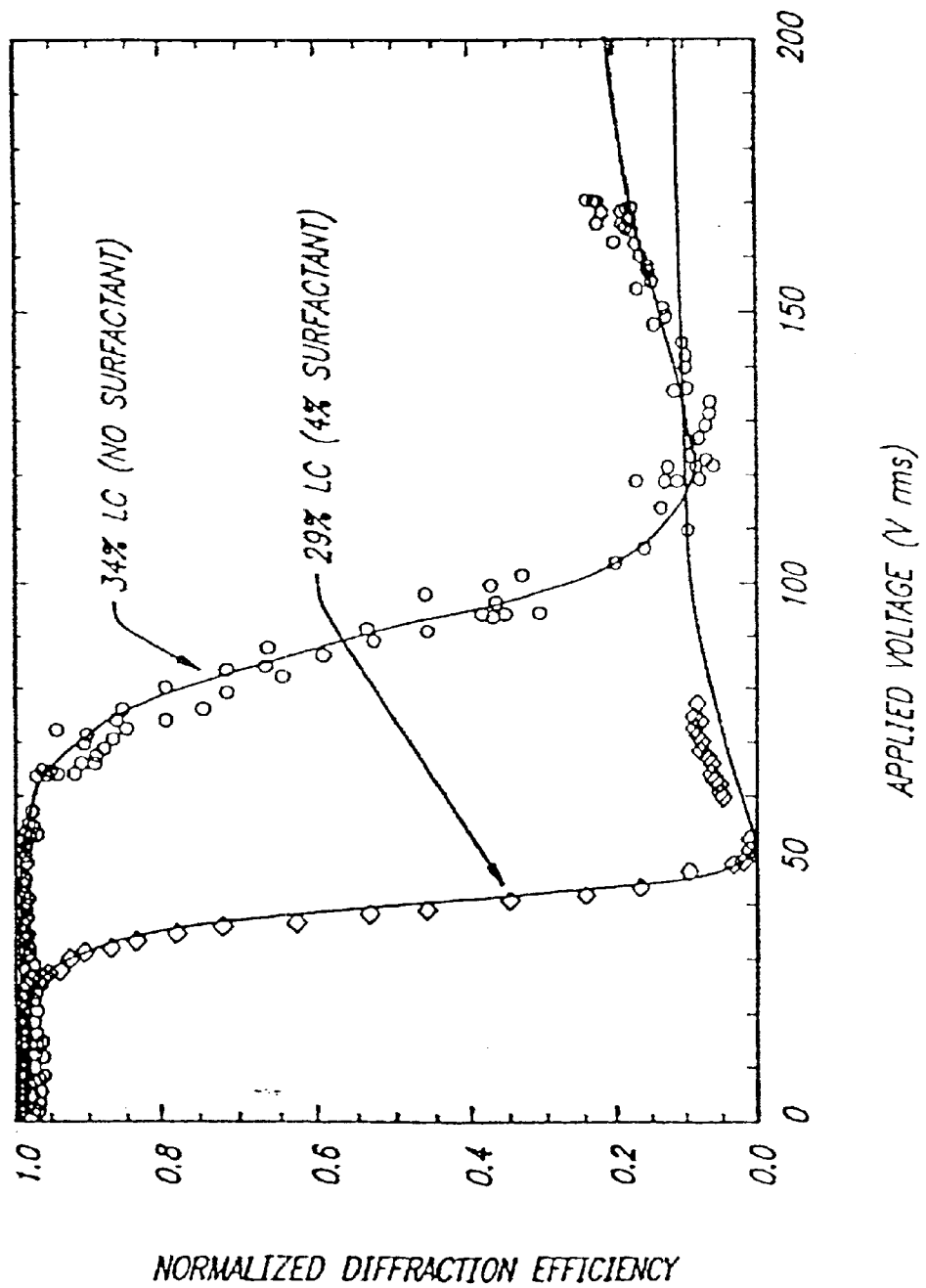
FIG. 4 is a graph of the normalized diffraction efficiency as a function of the applied electric field a PDLC material formed with 34% by weight liquid crystal surfactant present and a PDLC material formed with 29% by weight liquid crystal and 4% by weight surfactant.
Figure 5:
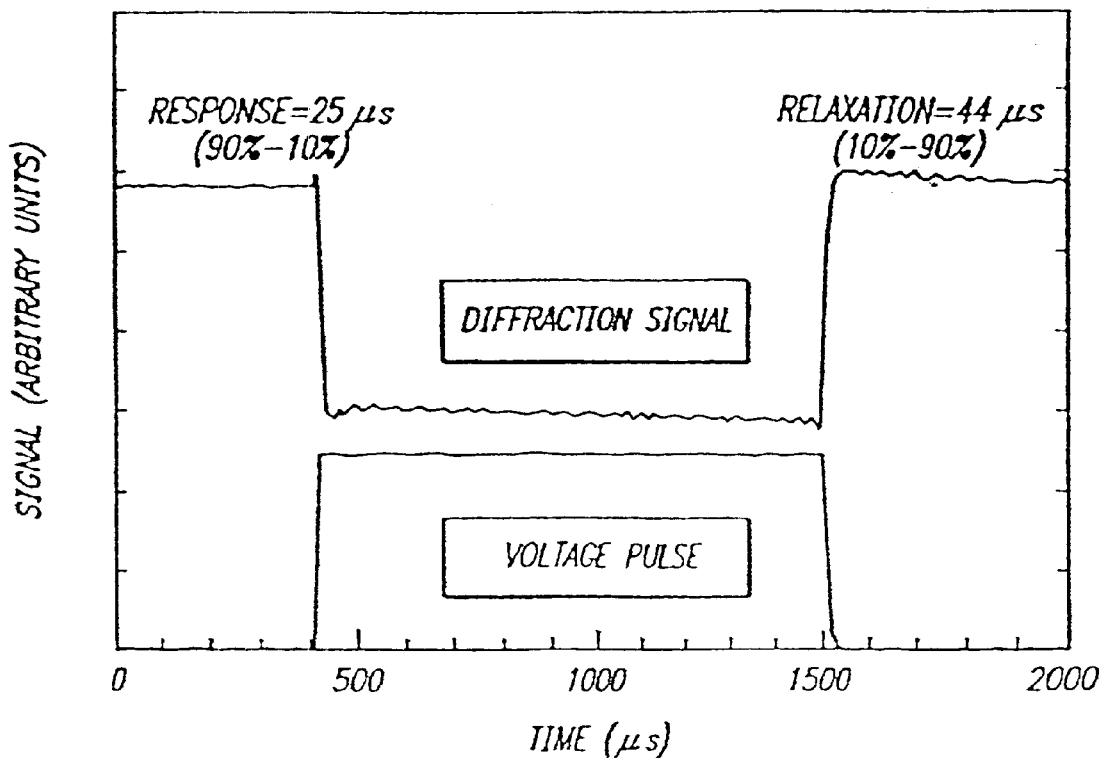
FIG. 5 is a graph showing the switching response time data for the diffracted beam in the surfactant-containing PDLC material in FIG. 4.
Figure 6:
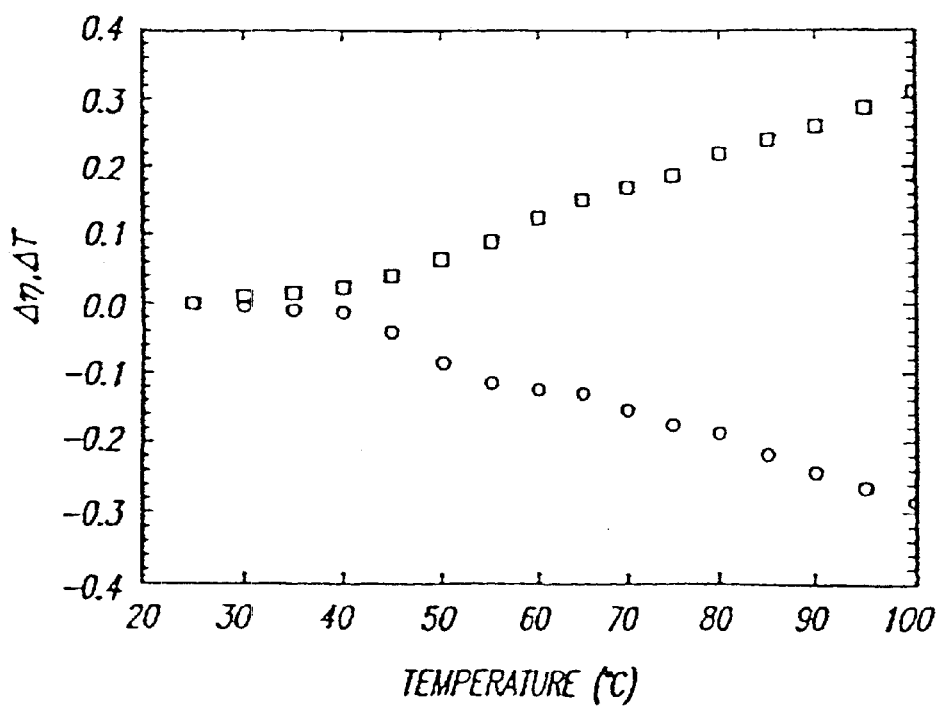
FIG. 6 is a graph of the normalized net transmittance and the normalized net diffraction efficiency a hologram.

Smaller liquid crystal droplet sizes have the problem that it takes high switching voltages to switch their orientation. As described in the previous paragraph, using alternating current switching voltages at high frequencies helps reduce the needed switching voltage. As demonstrated in FIG. 4, it has been found that adding a surfactant (e.g., octanoic acid) the prepolymer material in amounts of about 4%–6% by weight of the total mixture results in sample holograms with switching voltages near 50 Vrms at lower frequencies of 1–2 kHz. As shown in FIG. 5, it has also been found that the use of the surfactant with the associated reduction in droplet size reduces the switching time of the PDLC materials. Thus, samples made with surfactant can be switched on the order of 25–44 microseconds. Without wishing to be bound by any theory, the surfactant is believed to reduce switching voltages by reducing the anchoring of the liquid crystals at the interface between liquid crystal and cured polymer.

Thermal control of diffraction efficiency is illustrated in FIG. 5. FIG. 5 is a graph of the normalized net transmittance and normalized net diffraction efficiency of a hologram made according to the teachings of this disclosure versus temperature.

The polymer dispersed liquid crystal materials described herein successfully demonstrate the utility for recording volume holograms of a particular composition for such polymer dispersed liquid crystal systems.

Figure 7:
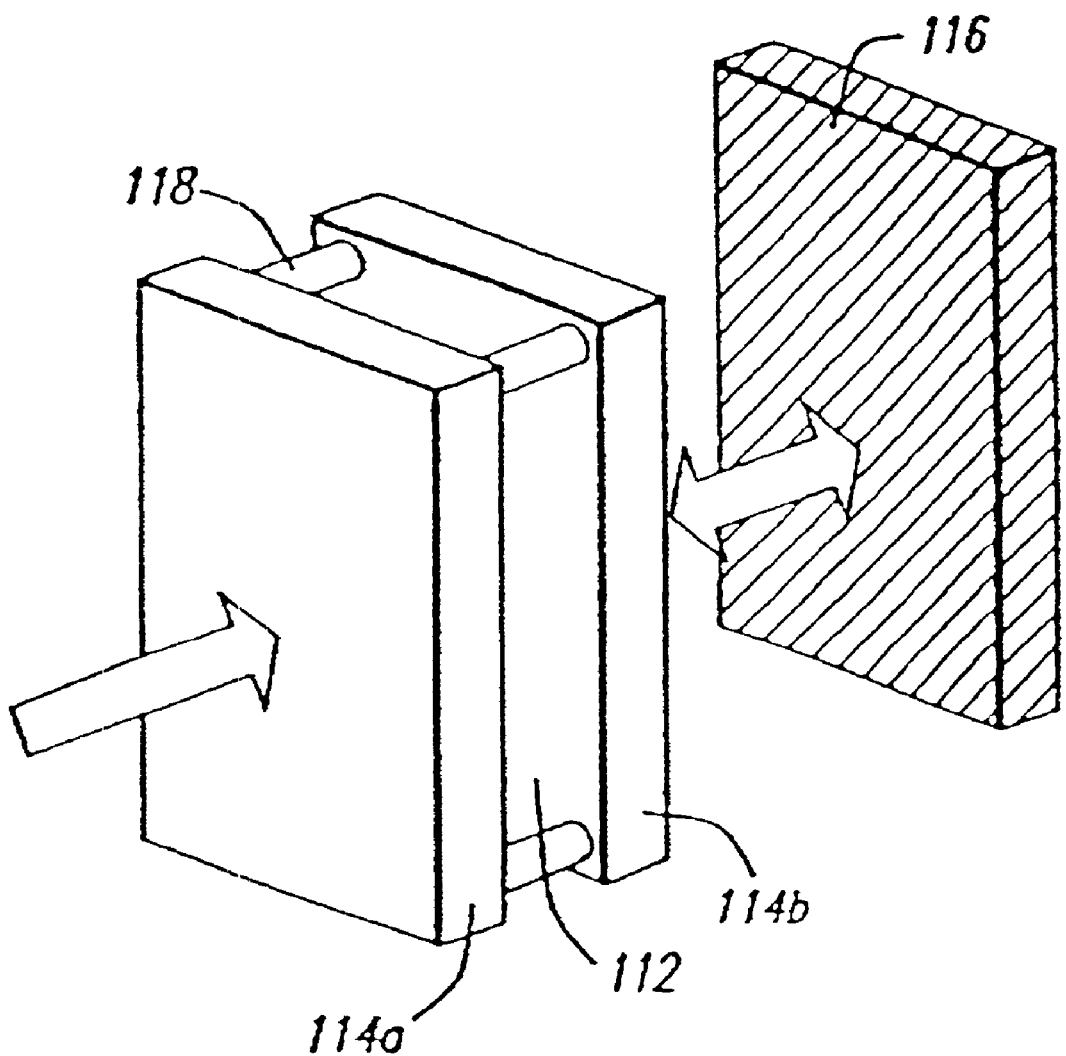
FIG. 7 is an elevation view of typical experimental arrangement for recording reflection gratings.

As shown in FIG. 7, a PDLC reflection grating is prepared by placing several drops of the mixture of prepolymer material 112 on an indium-tin oxide coated glass slide 114a. A second indium-tin oxide coated slide 114b is then pressed against the first, thereby causing the prepolymer material 112 to fill the region between the slides 114a and 114b. Preferably, the separation of the slides is maintained at approximately 20 µm by utilizing uniform spacers 118. Preparation, mixing and transfer of the prepolymer material is preferably done in the dark. Once assembled, a mirror 116 may be placed directly behind the glass plate 114b. The distance of the mirror from the sample is preferably substantially shorter than the coherence length of the laser. The PDLC material is preferably exposed to the 488 nm line of an argon-ion laser, expanded to fill the entire plane of the glass plate, with an intensity of approximately 0.1–100 mWatts/cm$^2$ with typical exposure times of 30–120 seconds. Constructive and destructive interference within the expanded beam establishes a periodic intensity profile through the thickness of the film.

In one embodiment, the prepolymer material utilized to make a reflection grating comprises a monomer, a liquid crystal, a cross-linking monomer, a co-initiator, and a photo-initiator dye. The reflection grating may be formed from prepolymer material comprising by total weight of the monomer dipentaerythritol hydroxypentacrylate (DPHA), 35% by total weight of a liquid crystal comprising a mixture of cyano biphenyls (known commercially as "E7"), 10% by total weight of a cross-linking monomer comprising N-vinylpyrrolidinone ("NVP"), 2.5% by weight of the co-initiator N-phenylglycine ("NPG"), and $10^{-5}$ to $10^{-6}$ gram moles of a photo-initiator dye comprising rose bengal ester. Further, as with transmission gratings, the addition of surfactants is expected to facilitate the same advantageous properties discussed above in connection with transmission gratings. It is also expected that similar ranges and variation of prepolymer starting material will find ready application in the formation of suitable reflection gratings.

It has been determined by low voltage, high resolution scanning electron microscopy ("LVHRSEM") that the resulting material comprises a fine grating with a periodicity of 165 nm with the grating vector perpendicular to the plane of the surface. Thus, as shown schematically in FIG. 8a, grating 130 includes periodic planes of polymer channels 130a and PDLC channels 130b which run parallel to the front surface 134. The grating spacing associated with these periodic planes remains relatively constant throughout the full thickness of the sample from the air/film to the film/substrate interface.

Although interference is used to prepare both transmission and reflection gratings, the morphology of the reflection grating differs significantly. In particular, it has been determined that, unlike transmission gratings with similar liquid crystal concentrations, very little coalescence of individual droplets was evident. Further more, the droplets that were present in the material were significantly smaller having diameters between 50 and 100 nm. Furthermore, unlike transmission gratings where the liquid crystal-rich regions typically comprise less than 40% of the grating, the liquid crystal-rich component of a reflection grating is significantly larger. Due to the much smaller periodicity associated with reflection gratings, i.e., a narrower grating spacing (~0.2 microns), it is believed that the time difference between completion of curing in high intensity versus low intensity regions is much smaller. It is also believed that the fast polymerization, as evidenced by small droplet diameters, traps a significant percentage of the liquid crystal in the matrix during gelation and precludes any substantial growth of large droplets or diffusion of small droplets into larger domains.

Analysis of the reflection notch in the absorbance spectrum supports the conclusion that a periodic refractive index modulation is disposed through the thickness of the film. In PDLC materials that are formed with the 488 nm line of an argon ion laser, the reflection notch typically has a reflection wavelength at approximately 472 nm for normal incidence and a relatively narrow bandwidth. The small difference between the writing wavelength and the reflection wavelength (approximately 5%) indicates that shrinkage of the film is not a significant problem. Moreover, it has been found that the performance of such gratings is stable over periods of many months.

In addition to the materials utilized in the one embodiment described above, it is believed that suitable PDLC materials could be prepared utilizing monomers such as triethyleneglycol diacrylate, trimethylolpropanetriacrylate, pentaerythritol triacrylate, pentaerythritol tetracrylate, pentaerythritol pentacrylate, and the like. Similarly, other co-initiators such as triethylamine, triethanolamine, N,N-dimethyl-2,6-diisopropylaniline, and the like could be used instead of N-phenylglycine. Where it is desirable to use the 458 nm, 476 nm, 488 nm or 514 nm lines of an Argon ion laser, that the photo-initiator dyes rose bengal sodium salt, eosin, eosin sodium salt, fluorescein sodium salt and the like will give favorable results. Where the 633 nm line is utilized, methylene blue will find ready application. Finally, it is believed that other liquid crystals such as 4'-pentyl-4-cyanobiphenyl or 4'-heptyl-4-cyanobiphenyl, can be utilized.

Figure 8B:
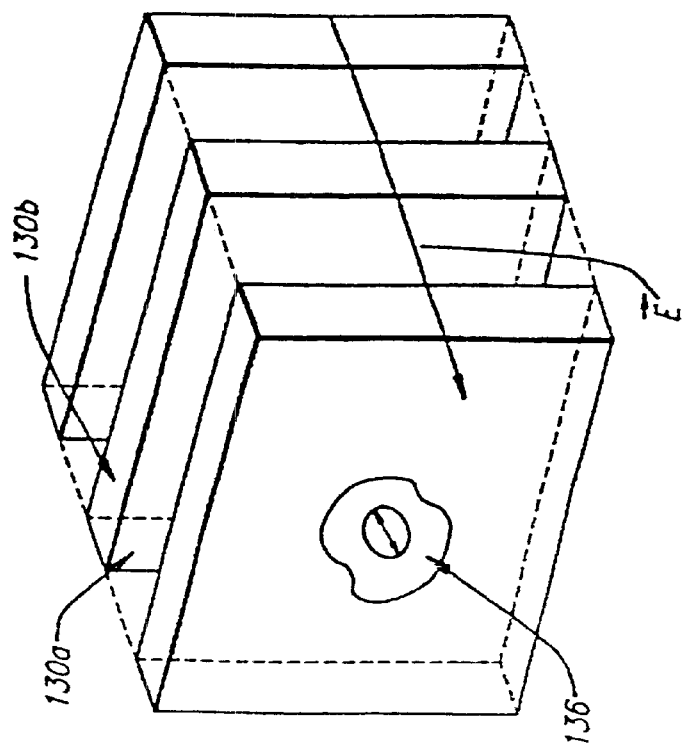
FIGS. 8a and 8b are elevational views of a reflection grating, made in accordance with the teachings of the description herein, having periodic planes of polymer channels and PDLC channels disposed parallel to the front surface in the absence of a field (FIG. 8a) and with an electric field applied (FIG. 8b) wherein the liquid-crystal utilized in the formation of the grating has a positive dielectric anisotropy.
Figure 8A:
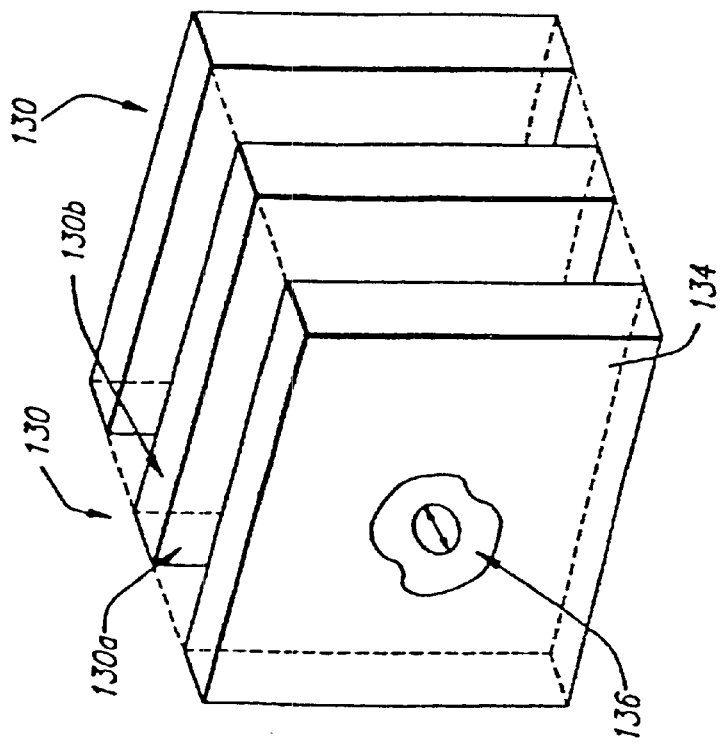

Referring again to FIG. 8a, there is shown an elevational view of a reflection grating 130 made in accordance with this disclosure having periodic planes of polymer channels 130a and PDLC channels 130b disposed parallel to the front surface 134 of the grating 130. The symmetry axis 136 of the liquid crystal domains is formed in a direction perpendicular to the periodic channels 130a and 130b of the grating 130 and perpendicular to the front surface 134 of the grating 130. Thus, when an electric field E is applied, as shown in FIG. 8b, the symmetry axis 136 is already in a low energy state in alignment with the field E and will reorient. Thus, reflection gratings formed in accordance with the procedure described above will not normally be switchable.

In general, a reflection grating tends to reflect a narrow wavelength band, such that the grating can be used as a reflection filter. In one embodiment, however, the reflection grating is formed so that it will be switchable. More particularly, switchable reflection gratings can be made utilizing negative dielectric anisotropy LCs (or LCs with a low cross-over frequency), an applied magnetic field, an applied shear stress field, or slanted gratings.

Figure 9B:
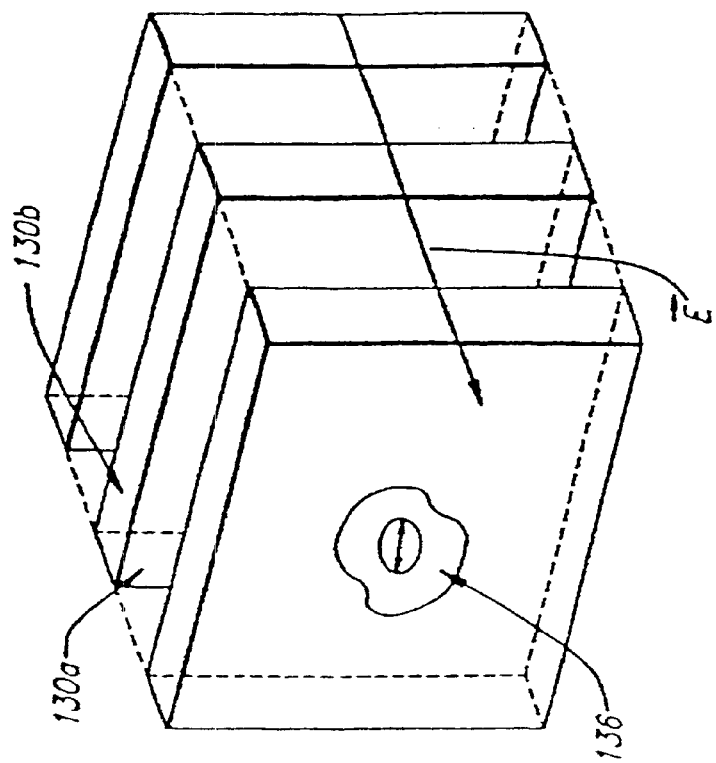
FIGS. 9a and 9b are elevational views of a reflection grating, made in accordance with the teachings of the description herein, having periodic planes of polymer channels and channels disposed parallel to the front surface of the grating in the absence of an electric field (FIG. 9a) and with an electric field applied (FIG. 9b) wherein the liquid crystal utilized in the formation of the grating has a negative dielectric anisotropy.
Figure 9A:
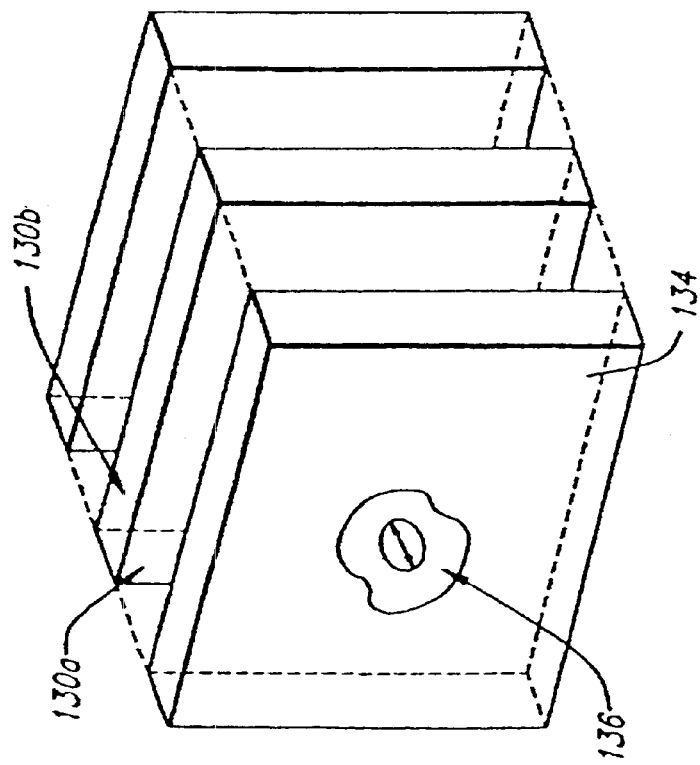

It is known that liquid crystals having a negative dielectric anisotropy ($\Delta\epsilon$) will rotate in a direction perpendicular to an applied field. As shown in FIG. 9a, the symmetry axis 136 of the liquid crystal domains formed with a liquid crystal having a negative $\Delta\epsilon$ will also be disposed in a direction perpendicular to the periodic channels 130a and 130b of the grating 130 and to the front surface 135 of the grating. However, when an electric field E is applied across such gratings, as shown in FIG. 9b, the symmetry axis of the negative $\Delta\epsilon$ liquid crystal will distort and reorient in a direction perpendicular to the field E, which is perpendicular to the film and the periodic planes of the grating. As a result, the reflection grating can be switched between a state where it is reflective and a state where it is transmissive. The following negative $\Delta\epsilon$ liquid crystals and others are expected to find ready applications in the methods and devises of the present invention:

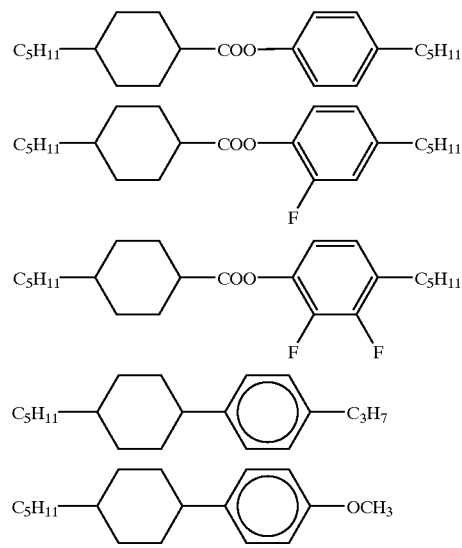

Liquid crystals can be found in nature (or synthesized) with either positive or negative $\Delta\epsilon$. Thus, it is possible to use a LC which has a positive $\Delta\epsilon$ at low frequencies, but becomes negative at high frequencies. The frequency (of the applied voltage) at which $\Delta\epsilon$ changes sign is called the crossover frequency. The cross-over frequency will vary with LC composition, and typical values range from 1–10 kHz. Thus, by operating at the proper frequency, the reflection grating may be switched. It is expected that low crossover frequency materials can be prepared from a combination of positive and negative dielectric anisotropy liquid crystals. A suitable positive dielectric liquid crystal for use in such a combination contains four ring esters as shown below:

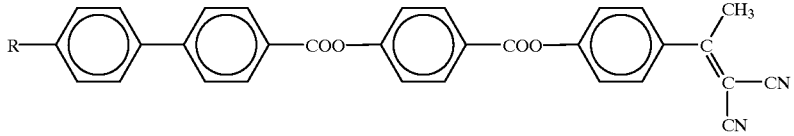

A strongly negative dielectric liquid crystal suitable for use in such a combination is made up of pyridazines as shown below:

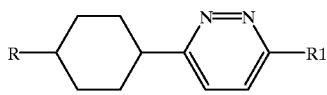

Both liquid crystal materials are available from LaRoche & Co., Switzerland. By varying the proportion of the positive and negative liquid crystals in the combination, crossover frequencies form 1.4–2.3 kHz are obtained at room temperature. Another combination suitable for use in the present embodiment is a combination of the following: p-pentylphenyl-2-chloro-4-(p-pentylbenzoyloxy) benzoate and benzoate. These materials are available from Kodak Company.

Figure 10A:
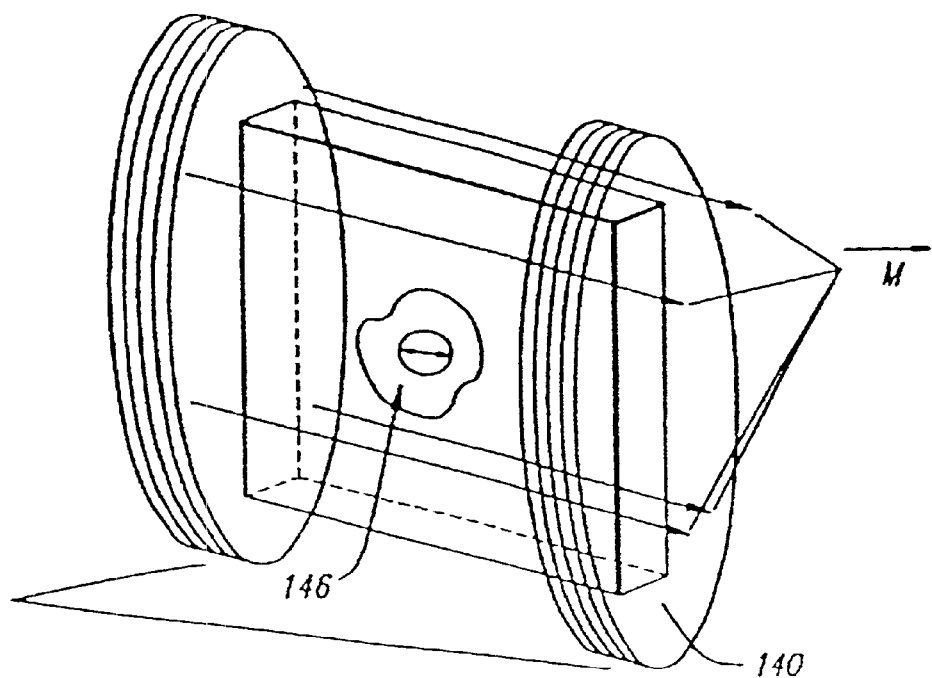
FIG. 10a is an elevational view of a reflection grating, made in accordance with the teachings of the description herein, disposed within a magnetic field generated by Helmholtz coils.
Figure 10B:
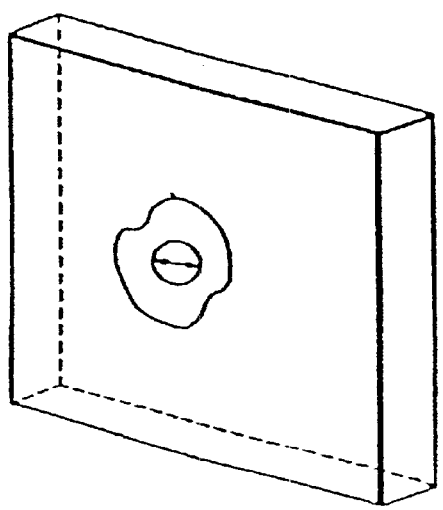
FIGS. 10b and 10c are elevational views of the reflection grating of FIG. 10a in the absence of an electric field (FIG. 10b) and with an electric field applied (FIG. 10c)
Figure 10C:
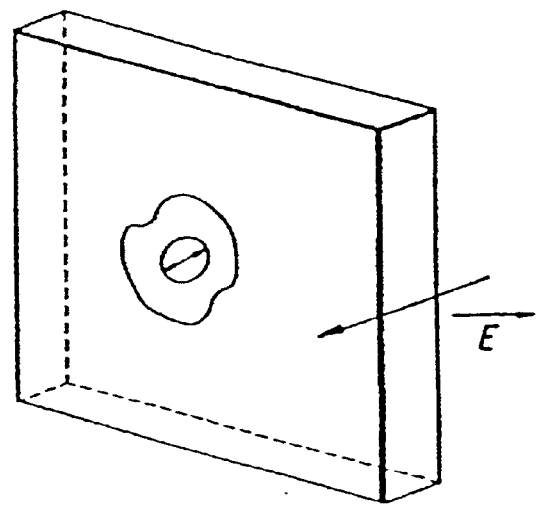

In still more detailed aspects, switchable reflection gratings can be formed using positive Δε liquid crystals. As shown in FIG. 10a, such gratings are formed by exposing the PDLC starting material to a magnetic field during the curing process. The magnetic field can be generated by the use of Helmholtz coils (as shown in FIG. 10a), the use of a permanent magnet, or other suitable means. Preferably, the magnetic field M is oriented parallel to the front surface of the glass plates (not shown) that are used to form the grating 140. As a result, the symmetry axis 146 of the liquid crystals will orient along the field while the mixture is fluid. When polymerization is complete, the field may be removed and the alignment of the symmetry axis of the liquid crystals will remain unchanged. (See FIG. 10b.) When an electric field is applied, as shown in FIG. 10c the positive Δε liquid crystal will reorient in the direction of the field, which is perpendicular to the front surface of grating and to the periodic channels of the grating.

Figure 11A:
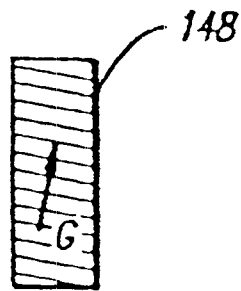
FIGS. 11a and 11b are representative side views of a slanted transmission grating (FIG. 11a) and a slanted reflection grating (FIG. 11b) showing the orientation of the grating vector G of the periodic planes of polymer channels and PDLC channels.
Figure 11B:
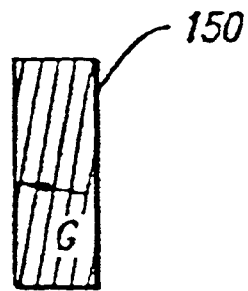

FIG. 11a depicts a slanted transmission grating 148 and FIG. 11b depicts a slanted reflection grating 150. A holographic transmission grating is considered slanted if the direction of the grating vector G is not parallel to the grating surface. In a holographic reflection grating, the grating is said to be slanted if the grating vector G is not perpendicular to the grating surface. Slanted gratings have many of the same uses as non-slanted grating such as visual displays, mirrors, line filters, optical switches, and the like.

Primarily, slanted holographic gratings are used to control the direction of a diffracted beam. For example, in reflection holograms a slanted grating is used to separate the specular reflection of the film from the diffracted beam. In a PDLC holographic grating, a slanted grating has an even more useful advantage. The slant allows the modulation depth of the grating to be controlled by an electric field when using either tangential or homeotropic aligned liquid crystals. This is because the slant provides components of the electric field in the directions both tangent and perpendicular to the grating vector. In particular, for the reflection grating, the LC domain symmetry axis will be oriented along the grating vector G and can be switched to a direction perpendicular to the film plane by a longitudinally applied field E. This is the typical geometry for switching of the diffraction efficiency of the slanted reflection grating.

When recording slanted reflection gratings, it is desirable to place the sample between the hypotenuses of two right-angle glass prisms. Neutral density filters can then be placed in optical contact with the back faces of the prisms using index matching fluids so as to frustrate back reflections which would cause spurious gratings to also be recorded. A conventional beam splitter splits the incident laser beam into two beams which are directed to the front faces of the prisms, and then overlapped in the sample at the desired angle. The beams thus enter the sample from opposite sides. This prism coupling technique permits the light to enter the sample at greater angles. The slant of the resulting grating is determined by the angle which the prism assembly is rotated (i.e., the angle between the direction of one incident beam and the normal to the prism front face at which that beam enters the prism).

Figure 12:
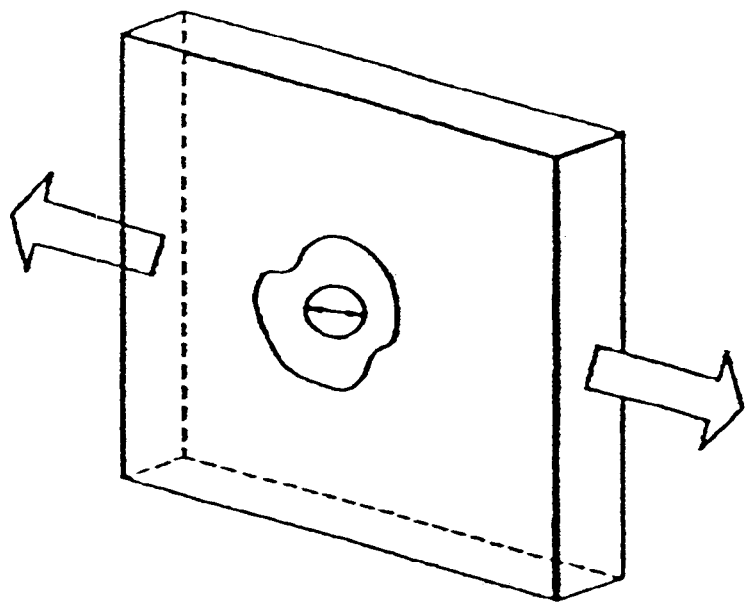
FIG. 12 is an elevational view of a reflection grating, made in accordance with the teachings of the description herein, when a shear stress field is applied thereto.

As shown in FIG. 12, switchable reflection gratings may be formed in the presence of an applied shear stress field. In this method, a shear stress would be applied along the direction of a magnetic field M. This could be accomplished, for example, by applying equal and opposite tensions to the two ITO coated glass plates which sandwich the prepolymer mixture while the polymer is still soft. This shear stress would distort the LC domains in the direction of the stress, and the resultant LC domain symmetry axis will be preferentially along the direction of the stress, parallel to the PDLC planes and perpendicular to the direction of the applied electric field for switching.

Reflection grating prepared in accordance with this description may find application in color reflective displays, switchable wavelength filters for laser protection, reflective optical elements and the like.

Figure 13:
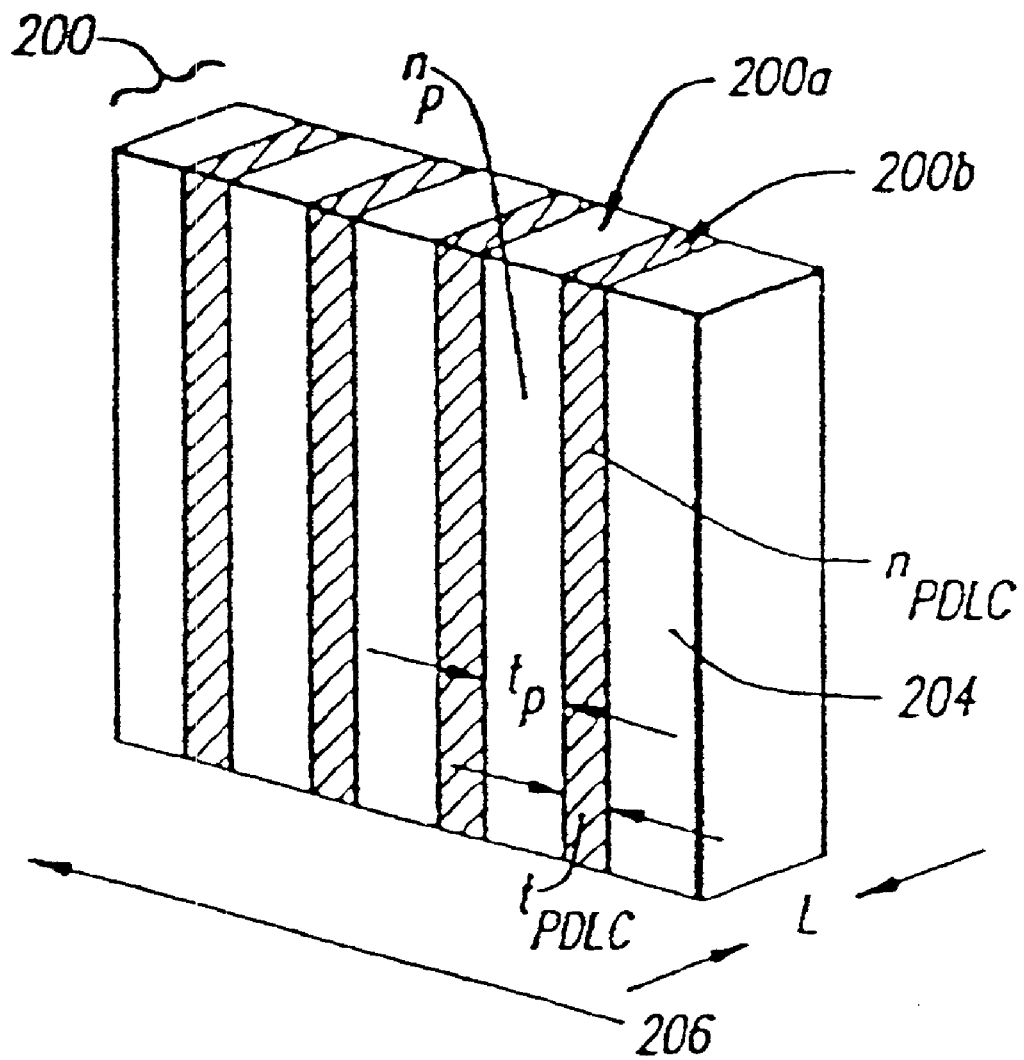
FIG. 13 is an elevational view of a subwavelength grating, made in accordance with the teachings of the description herein, having periodic planes of polymer channels and PDLC channels disposed perpendicular to the front surface of the grating.

In one embodiment, PDLC materials can be made that exhibit a property known as form birefringence whereby polarized light that is transmitted through the grating will have its polarization modified. Such gratings are known as subwavelength gratings, and they behave like a negative uniaxial crystal, such as calcite, potassium dihydrogen phosphate, or lithium niobate, with an optic axis perpendicular to the PDLC planes. Referring now to FIG. 13, there is shown an elevational view of a transmission grating 200 made in accordance with this description having periodic planes of polymer planes 200a and PDLC planes 200b disposed perpendicular to the front surface 204 of the grating 200. The optic axis 206 is disposed perpendicular to polymer planes 200a and the PDLC planes 200b. Each polymer plane 200a has a thickness $t_p$ and refractive index $n_p$, and each PDLC plane 200b has a thickness $t_{PDLC}$ and refractive index $n_{PDLC}$.

Where the combined thickness of the PDLC plane and the polymer plane is substantially less than an optical wavelength (i.e. $(t_{PDLC}+t_p) << \lambda$), the grating will exhibit form birefringence. As discussed below, the magnitude of the shift in polarization is proportional to the length of the grating. Thus, by carefully selecting the length, L, of the subwavelength grating for a given wavelength of light, one can rotate the plane of polarization or create circularly polarized light. Consequently, such subwavelength gratings can be designed to act as a half-wave or quarter-wave plate, respectively. Thus, an advantage of this process is that the birefringence of the material may be controlled by simple design parameters and optimized to a particular wavelength, rather than relying on the given birefringence of any material at that wavelength.

To form a half-wave plate, the retardance of the subwavelength grating must be equal to one-half of a wavelength, i.e., retardance=$|/2$, and to form a quarter-wave plate, the retardance must be equal to one-quarter of a wavelength, i.e., retardance=$|/4$. It is known that the retardance is related to the net birefringence, $|\Delta n|$, which is the difference between the ordinary index of refraction, $n_o$, and the extraordinary index of refraction $n_e$, of the sub-wavelength grating by the following relation:

$$\text{Retardance} = |\Delta n| L = |n_e - n_o| L$$

Thus, for a half-wave plate, i.e. a retardation equal to one-half of a wavelength, the length of the subwavelength grating should be selected so that:

$$L = \lambda / (2|\Delta n|)$$

Similarly, for a quarter-wave plate, i.e., a retardance equal to one-quarter of a wavelength, the length of the subwavelength grating should be selected so that:

$$L = \lambda / (4|\Delta n|)$$

Figure 14A:
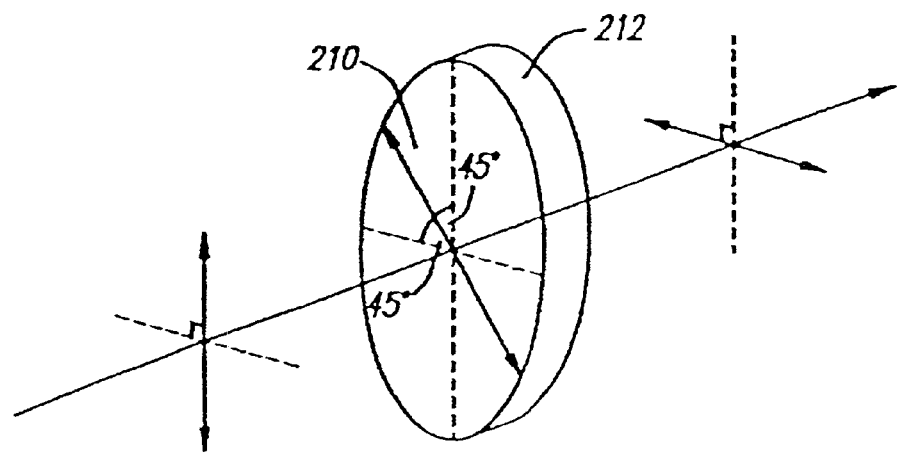
FIG. 14a is an elevational view of a switchable subwavelength, made in accordance with the teachings of the description herein, wherein the subwavelength grating functions as a half wave plate whereby the polarization of the incident radiation is rotated by 90°.
Figure 14B:
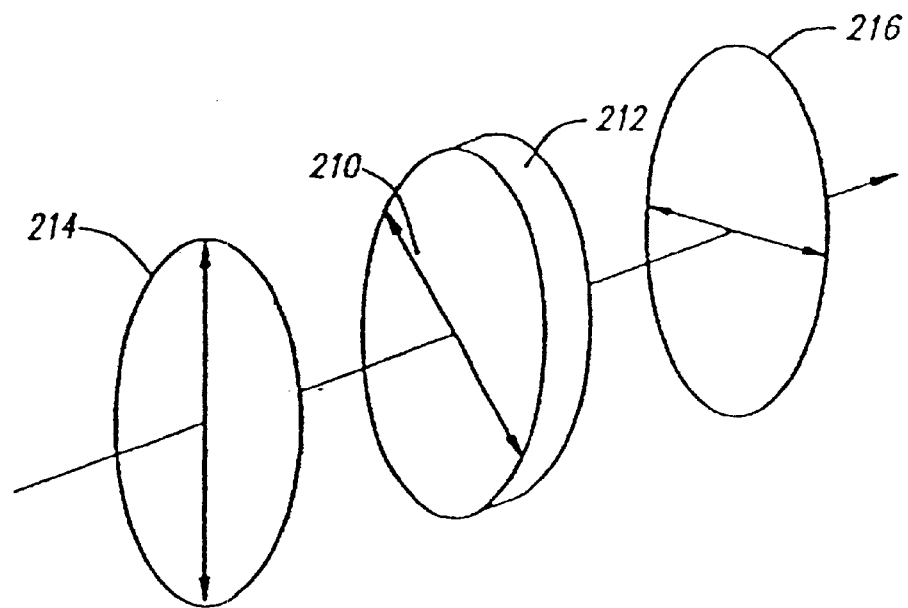
FIG. 14b is an elevational view of the switchable half wave plate shown in FIG. 14a disposed between crossed polarizers whereby the incident light is transmitted.
Figure 14C:
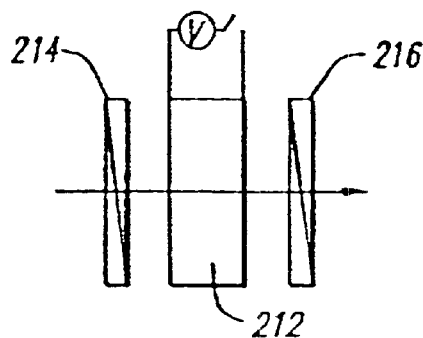
FIGS. 14c and 14d are side views of the switchable half wave plate and crossed polarizes shown in FIG. 14b and showing the effect of the application of a voltage to the plate where the polarization of the light is no longer rotated and thus blocked by the second polarizer.
Figure 14D:
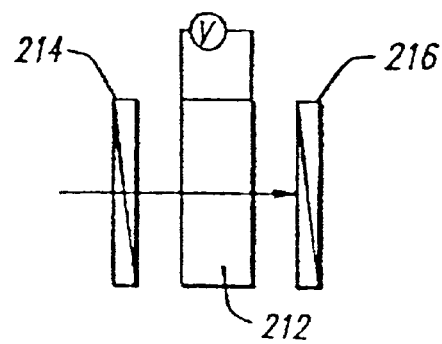

If, for example, the polarization of the incident light is at an angle of 45° with respect to the optic axis 210 of a half-wave plate 212, as shown in FIG. 14a, the plane polarization will be preserved, but the polarization of the wave exiting the plate will be shifted by 90°. Thus, referring now to FIG. 14b and 14c, where the half-wave plate 212 is placed between cross-polarizers 214 and 216, the incident light will be transmitted. If an appropriate switching voltage is applied, as shown in FIG. 14d, the polarization of the light is not rotated and the second polarizer will block the light.

Figure 15A:
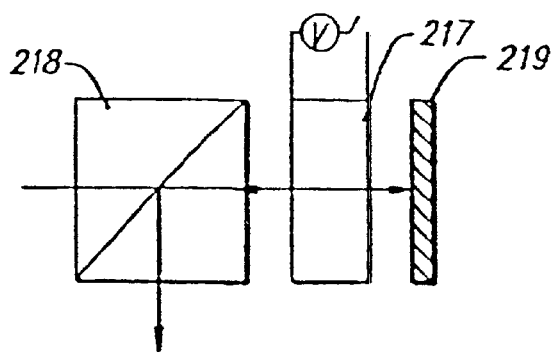
FIG. 15a is a side view of a switchable subwavelength grating, made in accordance with the teachings of the description herein, wherein the subwavelength grating functions as a quarter wave plate whereby plane polarized light is transmitted through the subwavelength grating, retroreflected by a mirror and reflected by the beam splitter.
Figure 15B:
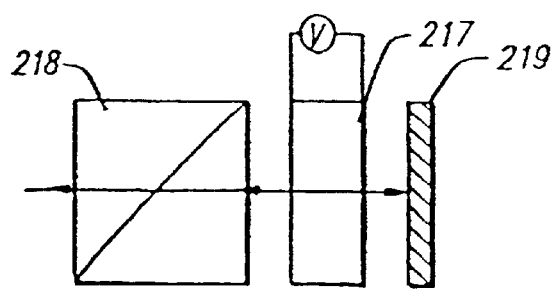
FIG. 15b is a side view of the switchable subwavelength grating of FIG. 15a and showing the effect of the application of a voltage to the plate whereby the polarization of the light is no longer modified, thereby permitting the reflected light to pass through the beam splitter.

For a quarter-wave plate plane polarized light is converted to circularly polarized light. Thus, referring now to FIG. 15a, where quarter-wave plate 217 is placed between a polarizing beam splitter 218 and a mirror 219, the reflected light will be reflected by the beam splitter 218. If an appropriate switching voltage is applied, as shown in FIG. 15b, the reflected light will pass through the beam splitter and be retroreflected on the incident beam.

Figure 16A:
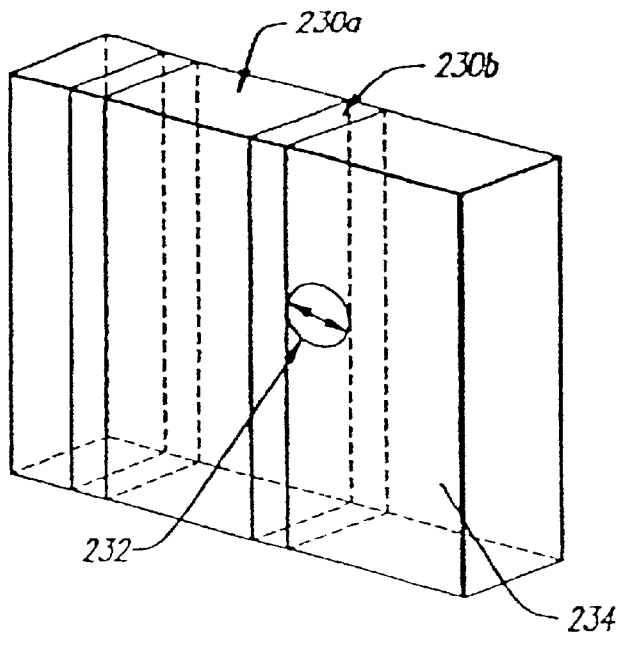
FIGS. 16a and 16b are elevational views of a transmission grating, made in accordance with the teachings of the description herein, having periodic planes of polymer channels and PDLC channels disposed perpendicular to the front face of the grating in the absence of an electric field (FIG. 16a) and with an electric field applied (FIG. 16b) wherein the liquid crystal utilized in formation of the grating has a positive dielectric anisotropy.

Referring now to FIG. 16a, there is shown an elevational view of a subwavelength grating 230 recorded in accordance with the above-described methods and having periodic planes of polymer channels 230a and PDLC channels 230b disposed perpendicular to the front surface 234 of grating 230. As shown in FIG. 16a, the symmetry axis 232 of the liquid crystal domains is disposed in a direction parallel to the front surface 234 of the grating and perpendicular to the periodic channels 230a and 230b of the grating 230. Thus, when an electric field E is applied across the grating, as shown in FIG. 15b, the symmetry axis 232 distorts and reorients in a direction along the field E, which is perpendicular to the front surface 234 of the grating, and parallel to the periodic channels 230a and 230b of the grating 230. As a result, subwavelength grating 230 can be switched between a state where it changes the polarization of the incident radiation and a state in which it does not. Without wishing to be bound by any theory, it is currently believed that the direction of the liquid crystal domain symmetry 232 is due to a surface tension gradient which occurs as a result of the anisotropic diffusion of monomer and liquid crystal during recording of the grating, and that this gradient causes the liquid crystal domain symmetry to orient in a direction perpendicular to the periodic planes.

As discussed in Born and Wolf, Principles of Optics, 5$^{th}$ Ed., New York (1975) and incorporated herein by reference, the birefringence of a subwavelength grating is given by the following relation:

$$n_e^2 - n_o^2 = -[(f_{PDLC})(f_p)(n_{PDLC}^2 - n_p^2)] / [f_{PDLC} n_{PDLC}^2 + f_p n_p^2]$$

Where

| | |
|---|---|
| $n_o =$ | the ordinary index of refraction of the subwavelength grating; |
| $n_e =$ | the extraordinary index of refraction; |
| $n_{PDLC} =$ | the refractive index of the PDLC plane; |
| $n_p =$ | the refractive index of the polymer plane |
| $n_{LC} =$ | the effective refractive index of the liquid crystal seen by an incident optical wave; |
| $f_{PDLC} =$ | $t_{PDLC}/(t_{PDLC} + t_P)$ |
| $f_P =$ | $t_P/(t_{PDLC} + t_P)$ |

Thus, the net birefringence of the subwavelength grating will be zero if $n_{PDLC} = n_P$.

It is known that the effective refractive index of the liquid crystal, $n_{LC}$, is a function of the applied electric field, having a maximum when the field is zero and value equal to that of the polymer, $n_P$, at some value of the electric field, $E_{MAX}$. Thus, by application of an electric field, the refractive index of the liquid crystal, $n_{LC}$, and, hence, the refractive index of the PDLC plane can be altered. Using the relationship set forth above, the net birefringence of a subwavelength grating will be a minimum when $n_{PDLC}$ is equal to $n_P$, i.e. when $n_{LC} = n_P$. Therefore, if the refractive index of the PDLC plane can be matched to the refractive index of the polymer plane, i.e. $n_{PDLC} = n_P$, by the application of an electric field, the birefringence of the subwavelength grating can be switched off.

The following equation for net birefringence, i.e. $|\Delta n| = |n_e - n_o|$, follows from the equation given in Born and Wolf (reproduced above):

$$\Delta n = -[(f_{PDLC})(f_p)(n_{PDLC} - n_p^2)] / [2n_{AVG}(f_{PDLC}n_{PDLC}^2 + f_p n_p^2)]$$

where $$n_{AVG} = (n_e + n_o)/2$$

Furthermore, it is known that the refractive index of the PDLC plane $n_{PDLC}$ is related to the effective refractive index of the liquid crystal seen by an incident optical wave, $n_{LC}$, and the refractive index of the surrounding polymer plane, $n_P$, by the following relation:

$$N_{PDLC} = n_P + f_{LC}[n_{LC} - n_P]$$

Where $f_{LC}$ is the volume fraction of liquid crystal dispersed in the polymer within the PDLC plane, $f_{LC} = [V_{LC}/(V_{LC} + V_P)]$.

By way of example, a typical value for the effective refractive index for the liquid crystal in the absence of an electric field is $n_{LC}=1.7$, and for the polymer layer $n_P=1.5$. For the grating where the thickness of the PDLC planes and the polymer planes are equal (i.e. $t_{PDLC}=t_P$, $f_{PDLC}=0.5=f_P$) and $f_{LC}=0.35$, the net birefringence, $\Delta n$, of the subwavelength grating is approximately 0.008. Thus, where the incident light has a wavelength of 0.8 $\mu$m, the length of the subwavelength grating should be 50 $\mu$m for a half-wave plate and a 25 $\mu$m for a quarter-wave plate. Furthermore, by application of an electric field of approximately 5 V/$\mu$m, the refractive index of the liquid crystal can be matched to the refractive index of the polymer and the birefringence of the subwavelength grating turned off. Thus, the switching voltage, $V_n$, for a half-wave plate is on the order of 250 volts, and for a quarter-wave plate approximately 125 volts.

By applying such voltages, the plates can be switched between the on and off (zero retardance) states on the order of microseconds. As a means of comparison, current Pockels cell technology can be switched in nanoseconds with voltages of approximately 1000–2000 volts, and bulk nematic liquid crystals can be switched on the order of milliseconds with voltages of approximately 5 volts.

Figure 17:
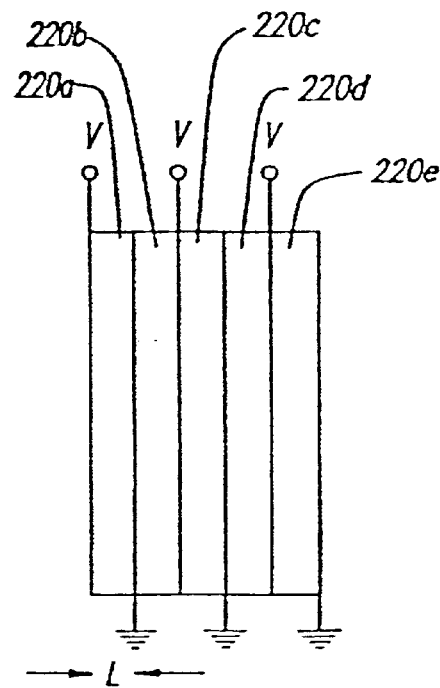
FIG. 17 is a side view of five subwavelength gratings wherein the gratings are stacked and connected electrically in parallel thereby reducing the switching voltage of the subwavelength grating.
Figure 16B:
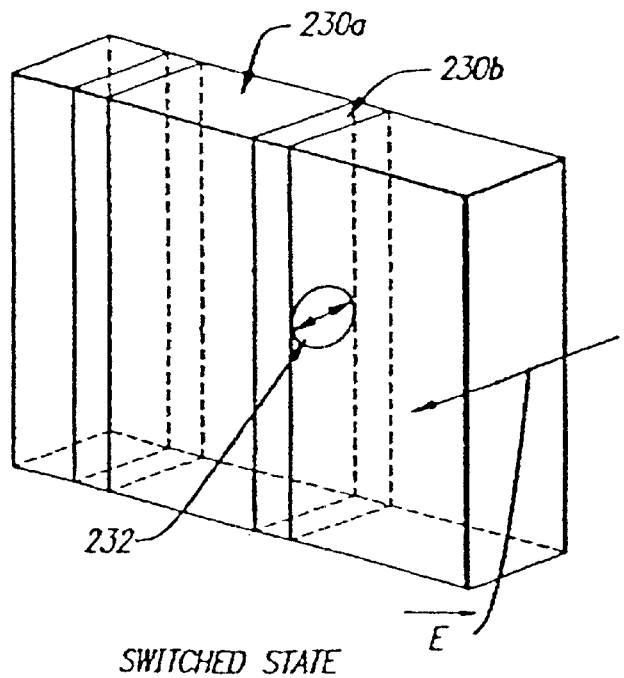

In an alternative embodiment, as shown in FIG. 17, the switching voltage of the subwavelength grating can be reduced by stacking several subwavelength gratings 220a–220e together, and connecting them electrically in parallel. By way of example, it has been found that a stack of five gratings each with a length of 10 $\mu$m yields the thickness required for a half-wave plate. It should be noted that the length of the sample is somewhat greater than 50 $\mu$m, because each grating includes an indium-tin-oxide coating which acts as a transparent electrode. The switching voltage for such a stack of plates, however, is only 50 volts.

Subwavelength gratings in accordance with the this description are expected to find suitable application in the areas of polarization optics and optical switches for displays and laser optics, as well as tunable filters for telecommunications, colorimetry, spectroscopy, laser protection, and the like. Similarly, electrically switchable transmission gratings have many applications for which beams of light must be deflected or holographic images switched. Among these applications are: Fiber optic switches, reprogrammable NxN optical interconnects for optical computing, beam steering for laser surgery, beam steering for laser radar, holographic image storage and retrieval, digital zoom optics (switchable holographic lenses), graphic arts and entertainment, and the like.

A switchable hologram is one for which the diffraction efficiency of the hologram may be modulated by the application of an electric field, and can be switched from a fully on state (high diffraction efficiency) to a fully off state (low or zero diffraction efficiency). A static hologram is one whose properties remain fixed independent of an applied field. In accordance with this description, a high contrast status hologram can also be created. In this variation of this description, the holograms are recorded as described previously. The cured polymer film is then soaked in a suitable solvent at room temperature for a short duration and finally dried. For the liquid crystal E7, methanol has shown satisfactory application. Other potential solvents include alcohols such as ethanol, hydrocarbons such as hexane and heptane, and the like. When the material is dried, a high contrast status hologram with high diffraction efficiency results. The high diffraction efficiency is a consequence of the large index modulation in the film ($\Delta n\sim 0.5$) because the second phase domains are replaced with empty (air) voids ($n\sim 1$).

Similarly, in accordance with this description a high birefringence static sub-wavelength wave-plate can also be formed. Due to the fact that the refractive index for air is significantly lower than for most liquid crystals, the corresponding thickness of the half-wave plate would be reduced accordingly. Synthesized wave-plates in accordance with this description can be used in many applications employing polarization optics, particularly where a material of the appropriate birefringence that the appropriate wavelength is unavailable, too costly, or too bulky.

The term polymer dispersed liquid crystals and polymer dispersed liquid crystal material includes, as may be appropriate, solutions in which none of the monomers have yet polymerized or cured, solutions in which some polymerization has occurred, and solutions which have undergone complete polymerization. Those skilled in the art will clearly understand that the use herein of the standard term used in the art, "polymer dispersed liquid crystals" (which grammatically refers to liquid crystals dispersed in a fully polymerized matrix) is meant to include all or part of a more grammatically correct prepolymer dispersed liquid crystal material, or a more grammatically correct starting material for a polymer dispersed liquid crystal material.

2. Illumination of Displays Using Holographic Optical Elements

Figure 18B:
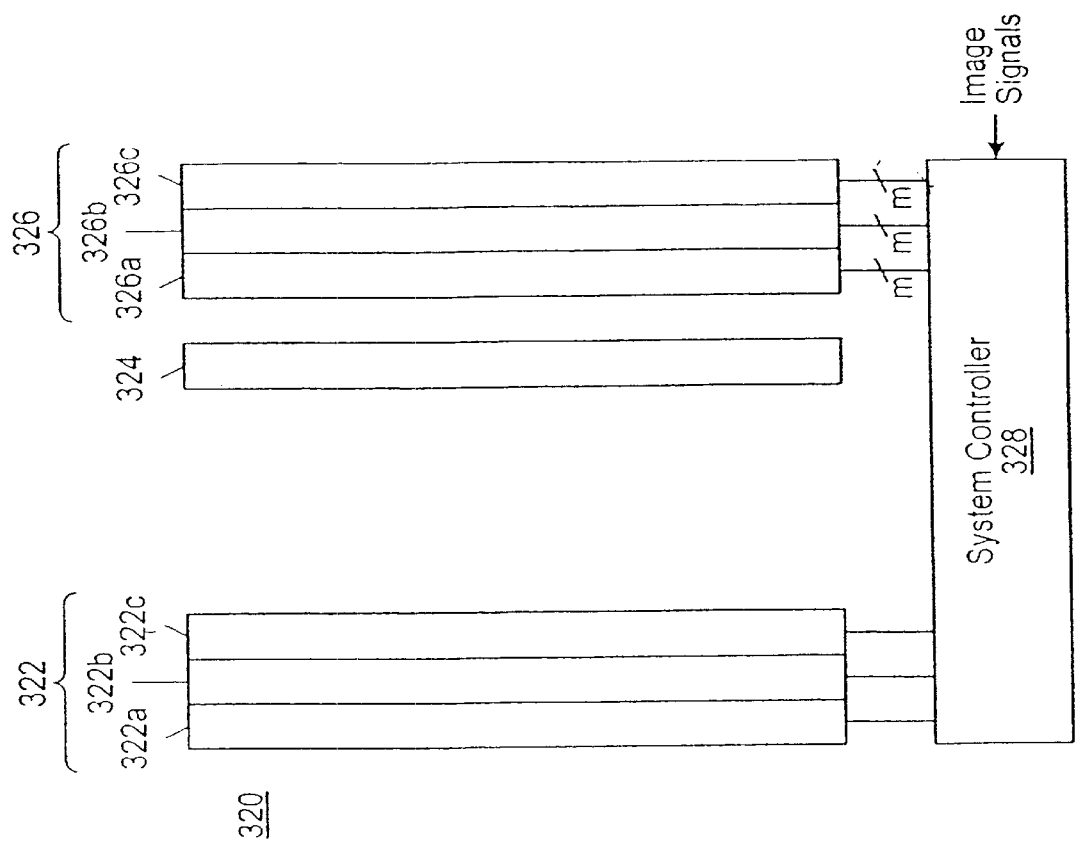
FIG. 18b is a block diagram of an optical system for illuminating a diffractive display system in accordance with one embodiment of the present invention.
Figure 18A:
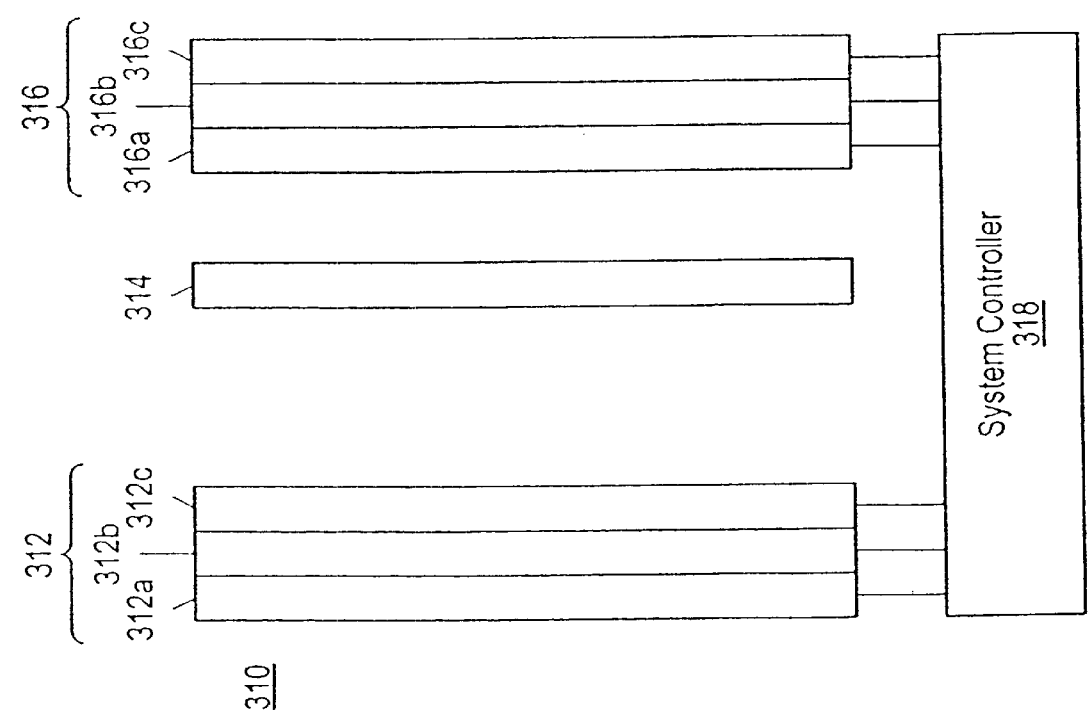
FIG. 18a is block diagram of an optical system for illuminating conventional display devices such as flat panel displays in accordance with one embodiment of the present invention.

FIG. 18a shows a block diagram of an optical system 310 used in illuminating conventional image displays such as flat panel displays. Optical system 310 includes a first optical subsystem 312, a quarter wave plate 314, a second optical subsystem 316, and a system controller 318. First optical subsystem 312, in turn, includes three distinct holographic optical elements 312a–312c. Likewise, second optical subsystem 316 includes three holographic optical elements 316a–316c. As shown in FIG. 18a, system controller 318 is individually coupled to each of the holographic optical elements 312a–312c and 316a–316c.

In FIG. 18a, each of the holographic optical elements 312a–312c and 316a–316c define a dynamic or switchable optical element configured to operate in active or inactive states depending upon a control signal provided by system controller 318. In the active state, each switchable holographic optical element is designed to diffract a select bandwidth of visible light (e.g., red light) incident thereon. In the inactive state, each switchable holographic optical element is configured to transmit substantially all light incident thereon without substantial alteration. In one sense, transmitting substantially all incident light without substantial alternation means that the optical element acts as a visibly transparent medium such as glass. It is noted, however, that the present invention can be employed with static holographic optical elements 312a–312c and 316a–316c that consistently diffract narrow bandwidth light, or with a combination of static and switchable holographic optical elements 312a–312c and 316a–316c. Moreover, the present invention as shown in FIG. 18a can be employed with a single switchable holographic optical element in each or either of the optical subsystems 312 and 316. Such a single switchable holographic optical element, operating in the active state in response to a single signal provided by system controller 318, is configured to simultaneously diffract three distinct bandwidths of visible light (e.g., red, blue, and green, respectively). In the inactive mode, the optical subsystem employing a single switchable holographic optical element is configured to transmit substantially all light incident thereon without substantial alteration. Nonetheless, the present invention as shown in FIG. 18a will be described with respect to optical subsystems 312 and 316 comprising individually switchable holographic optical elements, it being understood that the present invention as shown in FIG. 18a is not limited thereto.

FIG. 18b shows a block diagram of a system 320 employing the present invention. System 320 includes first optical subsystem 322, quarter wave plate 324, second optical subsystem 326, and system controller 328. First optical subsystem 322, in turn, includes three holographic optical elements 322a–322c. Likewise, the second optical element subsystem 326 includes three holographic optical elements 326a–326c. In the embodiment shown in FIG. 18b, the second optical subsystem 326 defines a diffractive display for generating images in response to image signals received by system controller 328 as will be more fully described below.

Each holographic optical element 322a–322c comprises, in one embodiment, a switchable holographic optical element that operates between active and inactive states in response to control signals provided by system controller 328. In the active state, each switchable holographic optical element is configured to diffract a select bandwidth of visible light (e.g., red light) incident thereon. In the inactive state, each switchable holographic optical element 322a–322c is configured to transmit substantially all visible light incident thereon without substantial alteration. It is noted, however, that each holographic optical element 322a–322c may be defined as a static holographic optical element that consistently diffracts a select bandwidth of light incident thereon. Moreover, first optical subsystem 322 may comprise a single switchable holographic optical element controlled by system controller 328. This single switchable holographic optical element is switchable between active and inactive states in accordance with a control signal provided by system controller 328. In the active state, this single switchable holographic optical element is configured to simultaneously diffract three distinct bandwidths of visible light incident thereon. The first optical subsystem 322 defined as a single switchable holographic optical element, is configured to transmit substantially all visible light incident thereon without substantial alternation when operating in the inactive state. The system shown in FIG. 18b will be described with reference to first optical subsystem 322 comprising three distinct switchable holographic optical elements each one switchable between active and inactive states. However, it is to be understood that the present invention is not to be limited thereto.

As noted above, the second optical subsystem 326 as shown in FIG. 18b defines a diffractive display that includes three distinct switchable holographic optical elements 326a–326c. As will be more fully described below, each of the optical elements 326a–326c includes a plurality of sub-areas. Each sub-area is individually switchable between the active state and the inactive state in accordance with control signals provided by system controller 328. Each sub-area when activated, is configured to diffract a select bandwidth of visible light incident thereon. Moreover, each sub-area when inactive, is configured to transmit substantially all visible light incident thereon without substantial alteration. The subareas of each holographic optical element 326a–326c are configured so that several may be active while the remainder are inactive in accordance with signals generated by system controller. Again, these features will be more fully described below.

FIG. 19a shows a cross sectional view of an example switchable holographic optical element that could be used within the first or second optical subsystems 312 and 316 shown in FIG. 18a, or the first optical subsystem 322 shown in FIG. 18b. The switchable holographic optical element 330 shown in FIG. 19a includes a pair of substantially transparent and electrically nonconductive layers 332, a pair of substantially transparent and electrically conductive layers 334, and a switchable holographic layer 336 formed, in one embodiment, from the polymer dispersed liquid material described above. In one embodiment, the substantially transparent, electrically nonconductive layers 332 comprise glass while the electrically conductive, substantially transparent layers 334 comprise indium tin oxide (ITO). An anti-reflection coating (not shown) may be applied to selected surfaces of the layered switchable holographic optical element including the ITO and the electrically nonconductive layers 332, to improve the overall transmission efficiency of the optical element and to reduce stray light. As shown in this embodiment of FIG. 19a, all layers 332–336 are arranged like a stack of pancakes on a common axis 338.

Layers 332–336 of the optical element 330 shown in FIG. 19a may have substantially thin cross-sectional widths thereby providing a substantially thin aggregate in cross section. More particularly, switchable holographic layer 336 may have a cross-sectional width of 5–12 microns (the precise width depending on the spectral bandwidth and required diffraction efficiency) while glass layers 332 may have a cross-sectional width of 0.4–0.8 millimeters. Obviously, ITO layers 334 must be substantially thin to be transparent.

In one embodiment, ITO layers 334 are selectively coupled to a voltage source (not shown in FIG. 19a or FIG. 19b) in accordance with a control signal provided by the system controller. When ITO layers 334 are coupled to the voltage source, an electric field is established within the switchable holographic layer 336, and the switchable holographic optical element 330 is said to operate in the inactive state. Stated differently, an electric field established between ITO layers 334 deactivates the switchable holographic optical element layer 336 such that substantially all light incident upon either surface of transparent nonconductive layers 332, regardless of incidence angle, is transmitted through the holographic optical element 330 without substantial alteration. When the ITO layers 334 are disconnected from the voltage source, the switchable holographic optical element 330 is said to operate in the active state. More particularly, when ITO layers 334 are decoupled from a voltage source, no electric field is present therebetween and a select bandwidth of visible light is diffracted in holographic layer 336. It is noted that switchable holographic layer 336 transmits light outside the select bandwidth without substantial alteration when activated.

FIG. 19b and 20 show an example of a switchable holographic optical element employed in the second optical subsystem (i.e., the diffractive display) of FIG. 18b. Additionally, FIG. 20 shows one embodiment of a system controller 328 shown in FIG. 18b. FIG. 19b shows a cross-sectional view of the switchable holographic optical element 340 shown in FIG. 20 taken along line 19b.

In FIGS. 19b and 20, switchable holographic optical element 340 includes a pair of substantially transparent and electrically nonconductive layers 342, a transparent and electrically conductive layer 344, a switchable holographic layer 346 formed, in one embodiment, from the polymer dispersed liquid crystal material described above, and a layer 348 which comprises an array of substantially transparent and electrically conductive elements 350 electrically isolated by an electrically nonconductive isolator 352. In one embodiment, the substantially transparent, electrically nonconductive layers 342 comprise glass while the electrically conductive, substantially transparent layer 344 and elements 350 of layer 348 comprise indium tin oxide (ITO). Antireflection coatings, not shown, may be provided on selected surfaces of the layers shown in FIG. 19b, including ITO layer 344 and transparent, electrically nonconductive layers 342, to improve the overall transmission efficiency of the switchable holographic optical element. In this embodiment, all layers 342–348 are arranged like a stack of pancakes on a common axis 354.

Layers 342–348 may have substantially thin cross-sectional widths thereby provided a substantially thin switchable holographic optical element in the aggregate. More particularly, switchable holographic layer 346 may have a cross-sectional width of 5–12 microns (the precise width depending on the spectral bandwidth and required diffraction efficiency) while glass layers 342 may have a cross-sectional width of 0.4–0.8 millimeters. ITO elements 350 must have a substantially thin cross section to be transparent.

As shown, more particularly, in FIG. 20, each ITO element 350 is selectively coupled to a voltage source 356 contained within system controller 328 via thin conductive lines 360, multiplexers 362 and switches 364, wherein the multiplexers 362 and switchers 364 operate in accordance with control signals generated by control logic circuit 366, which in turn operates in accordance with received image signals. The control signals generated by control logic circuit 366 are such that any one or more of the ITO elements 350 are coupled to voltage source 356 at any one point in time. Alternatively, all ITO elements may be decoupled from voltage source 356 at any point in time.

FIG. 20 shows a 4×4 array of ITO elements 350 with a substantial distance between each filled by electrically nonconductive isolator. It is to be noted that the switchable holographic optical element 340 shown in FIG. 20 may have application with an array having a greater number of rows and columns of ITO elements 350. Further FIG. 20 shows a large spacing between ITO layers so that conductive lines 360 can be easily identified. In practice, the spacing between ITO elements 350 need not be so large.

With continuing reference to FIG. 19b and 20, ITO layer 344 is generally coupled to one terminal (i.e., ground) of voltage source 356 (not shown in FIG. 19b). Accordingly, when one of the ITO elements 350 is coupled to the positive terminal of voltage source 356, a corresponding electric field is established within the underlying subarea of switchable holographic layer 356. Those subareas of switchable holographic layer 346 where an electric field is established are said to operate in the inactive state. The subareas of switchable holographic layer 346 where no electric field is established are said to operate in the active state. Inactive subareas transmit substantially all light incident thereon without substantial alteration. In contrast, subareas that are activated diffract select bandwidth of light incident thereon.

Switchable holographic layers 336 of FIG. 19a and 346 of Fib. 19b record holograms, in one embodiment, using the techniques described above. In one embodiment, a high diffraction efficiency and a fast rate at which the optical element can be switched between active and inactive states, characterize the resulting holograms. In the polymer dispersed liquid crystal (PDLC) material formed embodiment of switchable holographic layers 336 and 346, the recorded holograms can be switched from a diffracting state to a passing state with the creation and elimination of the electric field mentioned above. Ideally, the holograms would be Bragg (also known as thick or volume phase) type in order to achieve high diffraction efficiency, or Raman Nath (also known as thin phase) type in order to achieve high angular bandwidth.

The hologram recorded in switchable holographic layers 336 and 346 can be based on PDLC materials. The holograms, in one embodiment, result in an interference pattern created by recording beams, i.e., a reference beam and an object beam, within layer 336 or 346. Interaction of the laser light with the PDLC material causes photopolymerization. Intersection of the recording beams during the hologram recording process results in gratings (e.g., Bragg gratings) containing alternate liquid crystal droplets (i.e., high concentration of liquid crystal in polymer) and polymer (i.e., hardly any liquid crystal) surfaces. When a voltage is supplied to ITO layers 334, for example, in FIG. 19a, the liquid crystal droplets in layer 336 reorient and change the refractive index of the layer thereby essentially erasing the hologram recorded therein. The material used within layers 336 and 346 is configured to operate at a high switching rate (e.g., the material can be switched in tens of microseconds, which is very fast when compared with conventional liquid crystal display materials) and a high diffraction efficiency.

Figure 21A:
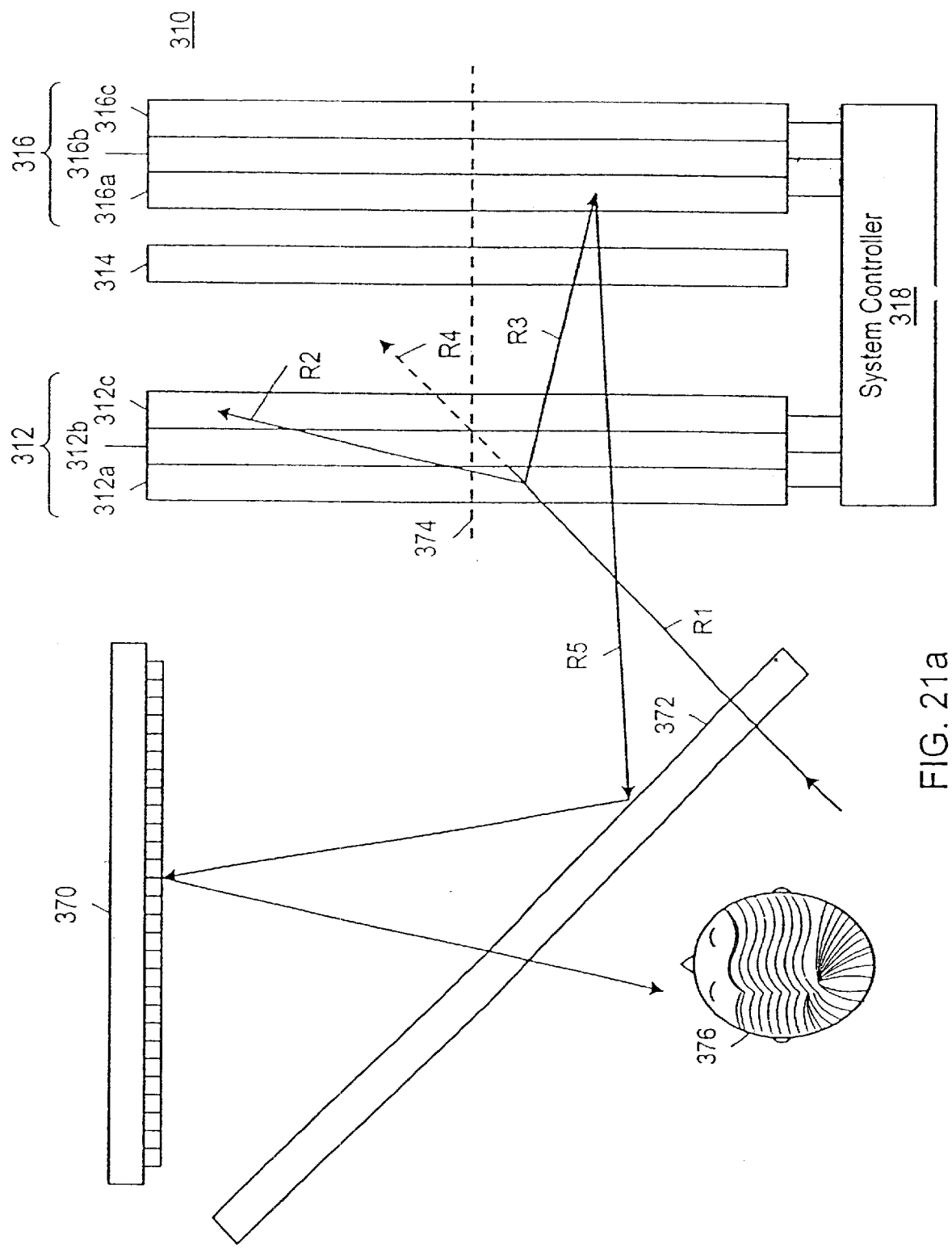
Figure 21B:
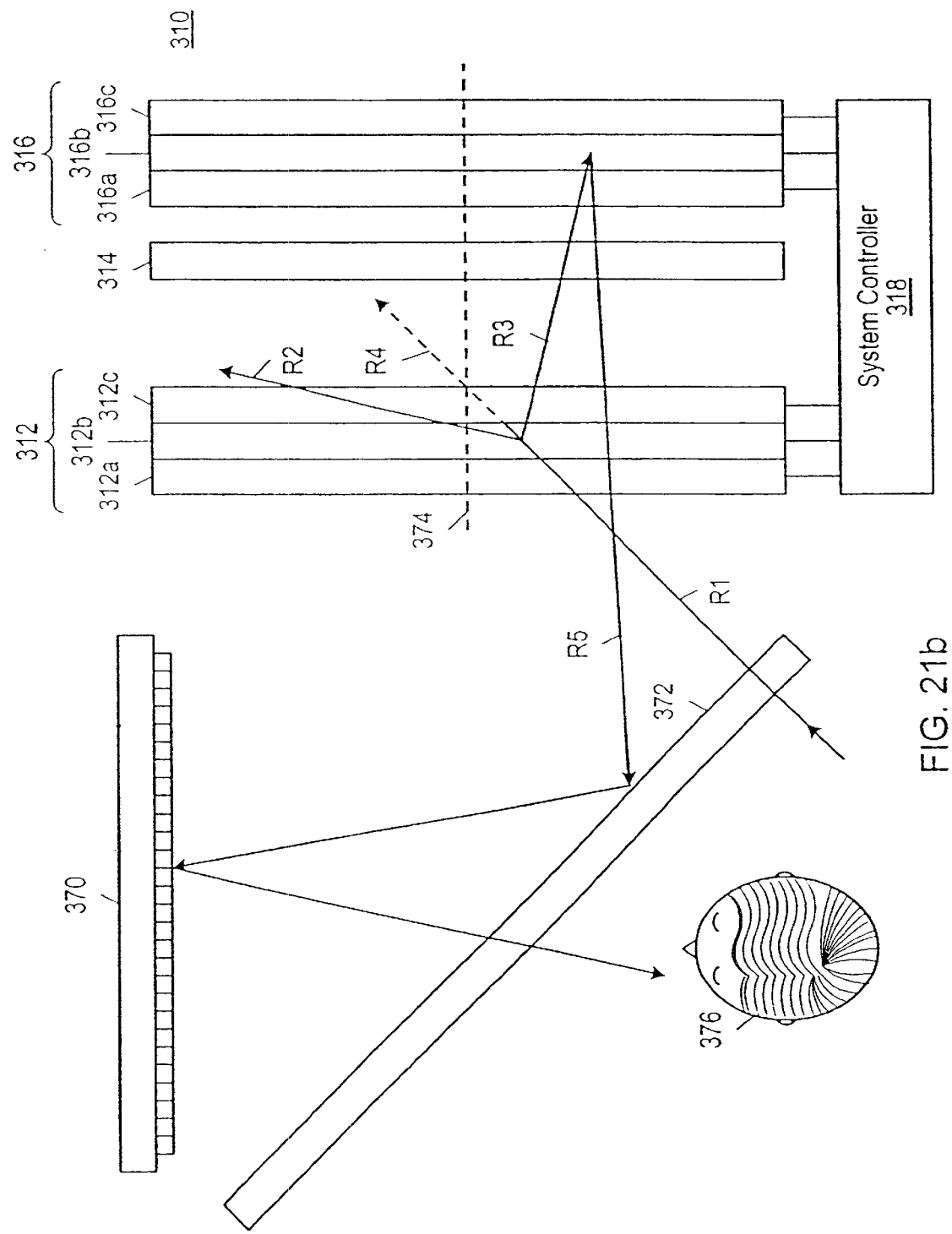
Figure 21C:
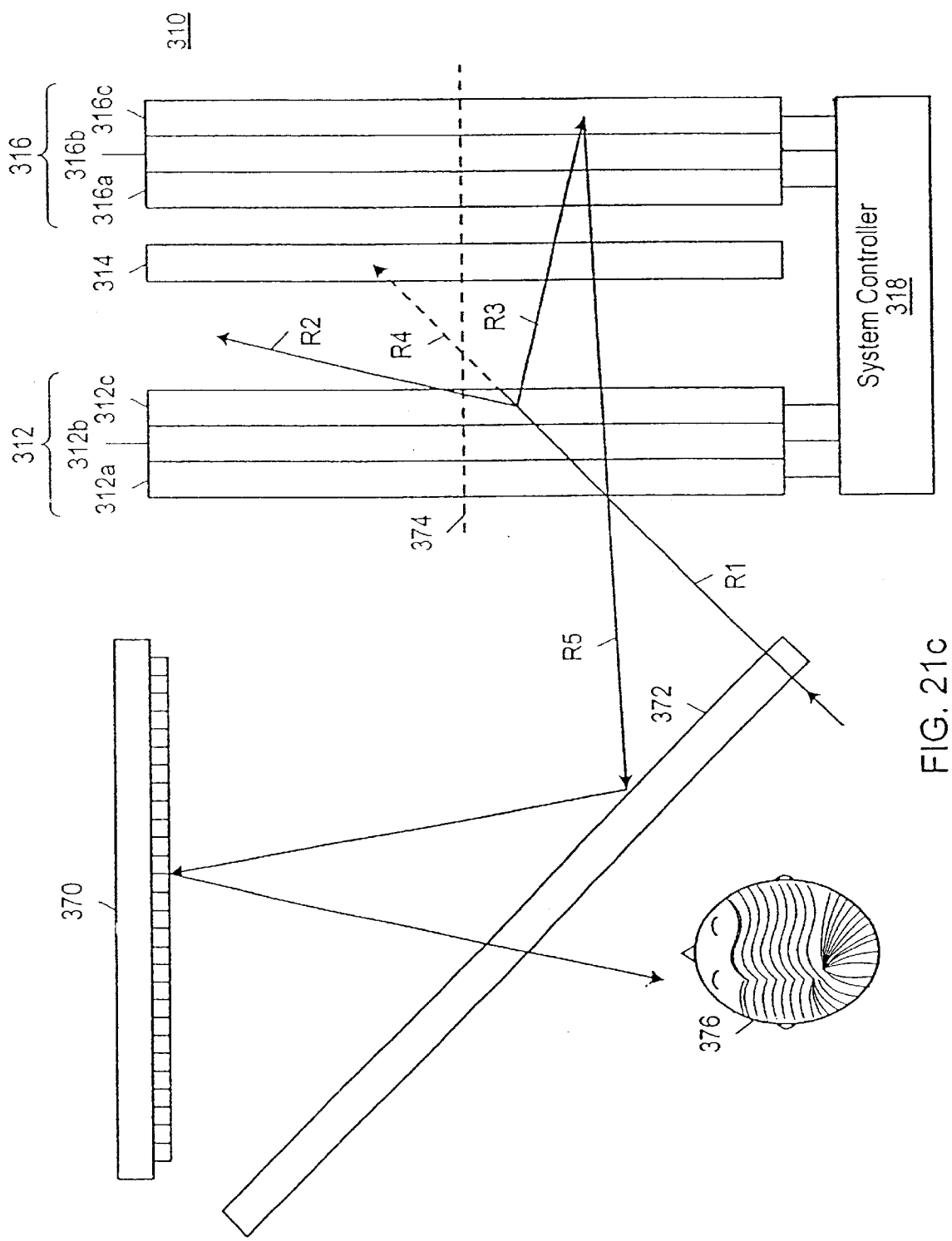

FIGS. 21a–21c illustrate operational aspects of one embodiment of the optical system 310 shown in FIG. 18a. In addition to the optical system 310, FIGS. 21a–c show a conventional flat panel display 370 and a conventional beam splitter 372. In one embodiment, first optical subsystem 312 comprises three thin phase, transmissive type switchable holographic optical elements 312a–312c. Here transmissive type relates to a switchable holographic optical element which emits diffracted light from a surface opposite the surface that receives light to be diffracted. In the embodiment shown in FIG. 21b, second optical subsystem 316 comprises three volume phase, reflective type switchable holographic optical elements 316a–316c. A reflective type holographic optical element emits diffracted light from the same surface that receives light to be diffracted.

The optical system 310 shown in FIGS. 21a–c illustrates a technique that uses the angular sensitivity and polarization characteristics of the switchable holographic optical elements 312a–312c and 316a–316c to illuminate the flat panel 370 using only ambient light. Ambient light is incident on the first optical subsystem 312 over a range of incidence angles ranging from approximately 40 degrees to grazing. FIG. 21a illustrates the propagation of one such ray RI incident on the front surface of first optical subsystem 312.

In FIG. 21a, system controller 318 activates holographic optical elements 312a and 316a and deactivates holographic optical elements 312b, 312c, 316b and 316c. Activated holographic optical elements 312a and 316a operate to diffract a select bandwidth of visible light incident thereon. In this embodiment, optical elements 312a and 316a, when activated, operate to diffract a narrow bandwidth of red light. Light of bandwidths outside of narrow red bandwidth are transmitted through activated optical elements 312a and 316a without substantial alteration. Optical elements 312b, 312c, 316b, and 316c, when inactive, operate to transmit substantially all light incident thereon without substantial alteration.

Figure 23:
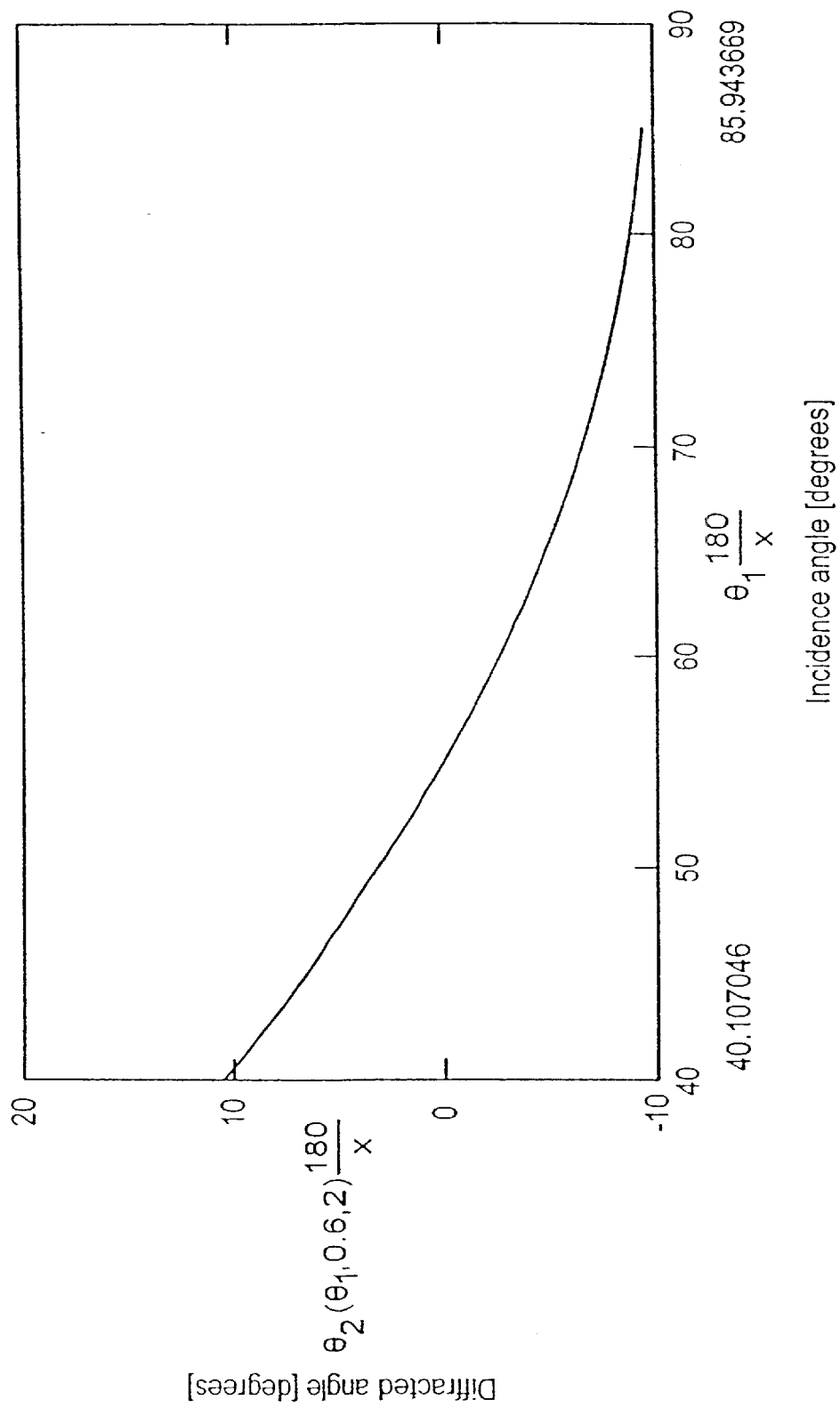
FIG. 23 is a graph showing the relation between emergence or diffracted angle and angle of incidence for a thin phase hologram.

In FIG. 21a ambient ray R1 constitutes the narrow red bandwidth component of ambient light. R1, after being received at the front surface of activated optical element 312a, is diffracted into a zero order beam R4 and first order diffracted beams R2 and R3. The transmissive type switchable holographic optical elements 312a–312c are designed so that rays, such as RI, with predominantly large incidence angles measured with respect to the optical axis 374 which is normal to the front surface, are diffracted to produce first order rays, such as R3, which have directions making a small emergence angle measured with respect to the optical axis 374. For example, referring to the calculated data in FIG. 23, incidence angles of rays R1 in the range of 40–90° will result in diffracted emergence angles covering an emergence angle range of approximately 20° in air.

Another feature of the transmissive type electrically switchable holographic optical elements used in this embodiment is that they tend to give maximum diffraction efficiency for p-polarized light, that is for light rays whose polarization vector lies in the plane of incidence. The diffraction efficiency for light polarized in a direction normal to the plane of incidence, that is the s-polarized light, can be as low as a few percent of the maximum p-polarized diffraction efficiency. In contrast, the reflective type switchable holographic optical elements used in this embodiment, do not exhibit a preference for any particular polarization state, at least over the range of incident angles considered by the present invention.

Due to the preferred polarization direction of the transmissive type switchable holographic optical elements 312a–312c, the light rays which are diffracted with high efficiencies will be p-polarized. Thus, R3 as shown in FIG. 21a is p-polarized light. Upon passing through quarter wave plate 314, R3 becomes circularly polarized and is received on the front surface of activated reflective type switchable holographic optical element 316a. Activated, optical element 316a diffracts R3, the diffracted light (5) emerging from the front surface of optical element 316a. Since the variations in directions of R3 tend to be small, R3 will satisfy the Bragg diffraction equation for the volume phase reflective type holographic optical element 316a. The diffracted ray will not suffer a polarization change since the reflective type hologram 316a is not polarization sensitive. Accordingly, the ray diffracted by activated holographic optical element 316a passes through quarter wave plate 314 and acquires a polarization orthogonal to that of R3. In other words, after passing through quarter wave plate 314 the ray will become predominantly s-polarized. This s-polarized ray is not significantly diffracted by any of the optical elements 312a–312c it being understood that activated holographic optical element 312a is not sensitive to s-polarized light. Thus, the s-polarized light transmits through activated optical element 312a substantially unaltered.

After emerging from the first optical subsystem, R5 is reflected off beam splitter 372 and illuminates flat panel display 370. Accordingly, it is seen that ambient light R1 is collected from a variety of incidence angles to illuminate flat panel display 370 for a viewer 376.

FIG. 21b shows operational aspects of the optical system 310 of FIG. 21a after system controller 318 deactivates optical elements 312a and 316a, activates optical elements 312b and 316b while maintaining optical elements 312c and 316c in the inactive state. Optical elements 312b and 316b are designed to diffract narrow band blue light when activated. Further, when activated, optical elements 312b and 316b transmit substantially all light outside narrow band blue light without substantial alteration. The operational aspects shown in FIG. 21b are substantially similar to that shown in FIG. 21a with ray R1 representing the blue bandwidth component of ambient light. Accordingly, ray R1 is converted by optical system 310 into ray R5 which is used to illuminate flat panel display 370 via beam splitter 372.

FIG. 21c shows operational aspects of the optical system 310 of FIG. 21b after system controller 318 activates optical elements 312c and 316c and deactivates optical elements 312b and 316b while maintaining optical elements 312a and 316a in the inactive status. Optical elements 312c and 316c are designed to diffract narrow band green light when active. Further, when active, optical elements 312c and 316c transmit substantially all light outside of narrow band green light without substantial alteration. The operational aspects shown in FIG. 21c are substantially similar to that shown in FIGS. 21a and 21b with ray R1 representing the green bandwidth component of ambient light. Accordingly, ambient light ray R1 of narrow band green light is converted by optical system 310 into ray R5 which is used to illuminate flat panel display 370 via beam splitter 372.

System controller 318 continuously cycles the activation and deactivation of pairs of optical elements within subsystems 312 and 316 as described in FIGS. 21a–21c. In this manner, flat panel display 370 is cyclically illuminated with red, blue, and green bandwidth light as corresponding monochrome components of full images are sequentially displayed. If the cycle time is sufficiently fast, viewer 376 will eye integrate the three red, blue, and green illuminated monochrome components to observe a sequence of full color images.

In the embodiments shown in FIGS. 21a–21c, optical elements 312a–312c comprise thin phase holograms while optical elements 316a–316c comprise volume phase holograms. Volume phase have higher diffraction efficiencies when compared to thin phase holograms. In theory, volume phase holograms have a theoretical maximum diffraction efficiency of 100%. In volume phase holograms, the diffracted light will have two main components, a zero order beam, which propagates in the direction of the incident beam and first order diffracted beams that satisfy the Bragg diffraction relation, which will normally carry the bulk of the diffracted light energy. There may also be higher order diffraction components, representing a small proportion of the total diffracted light. If the volume phase hologram has close to maximum theoretical efficiency, problems of dealing with zero order light are largely eliminated. The range of directions for which volume phase holograms will have high diffraction efficiencies is often referred to as angular bandwidth. Angular bandwidth is determined by the Kogelnik coupled wave theory which states that high Bragg efficiencies will only occur for incident beams that are within a few degrees of the theoretical beam incidence angle that exactly satisfies the Bragg diffraction condition. Thin phase holograms, in contrast, will give rise to ±1 diffracted orders and a zero order. The maximum diffraction efficiency in the first order is 33.8% for a sinusoidal profile and 40.4% for a square profile. In practice, only one of the diffracted orders can be used. The unused diffracted light in the zero order light may present stray light problems. However, one advantage of using thin phase holograms is that they have large angular bandwidths. Accordingly, in the embodiment shown in FIGS. 21a–21c, transmissive type switchable holographic optical elements 312a–312c comprise thin phase holograms having a wide angular bandwidth. This high angular bandwidth in essence allows the optical system 310 to collect ambient light over a large range of incidence angles made with respect with the optical axis 374. Further, the reflective type holographic optical elements 316a–316c comprise volume phase holograms with a smaller angular bandwidth but higher diffraction efficiency. However, given that R3 has a relatively small angle of incidence when received by the second optical subsystem, substantially all diffractive light R3 satisfies the Bragg edition. Accordingly, optical elements 316a–316c provide a high diffraction efficiency with respect to incident rays R3.

It is to be understood, however, that optical elements 312a–312c in FIGS. 21a–21c may comprise volume phase holograms. However, volume phase holograms with their narrower angular bandwidth, may limit collection of ambient light to a narrower range of incidence angles. As such, first optical subsystem 312 employing volume phase holograms may not provide as much of a concentrated beam for illumination of flat panel display 370 when compared to first optical subsystem comprising thin phase transmissive type holograms.

The distinction between thin phase and volume phase holograms is usually made on the basis of a Q parameter which is defined by the following equation:

$$Q = 2\pi \lambda d / [n \Lambda^2]$$

where $\lambda$ is the wavelength $\Lambda$ is the grating period d is the thickness of the holographic medium n is the refractive index of the holographic medium Typically, thin phase holograms have Q values smaller than one while volume phase holograms have Q values greater than one. A more complete distinction between thin phase and volume phase holograms can be found within Klein, W. R. and Cook, B. D., IEEE Transactions on Sonics and Ultrasonics SU-14, pp. 123–134 (1967).

Figure 22A:
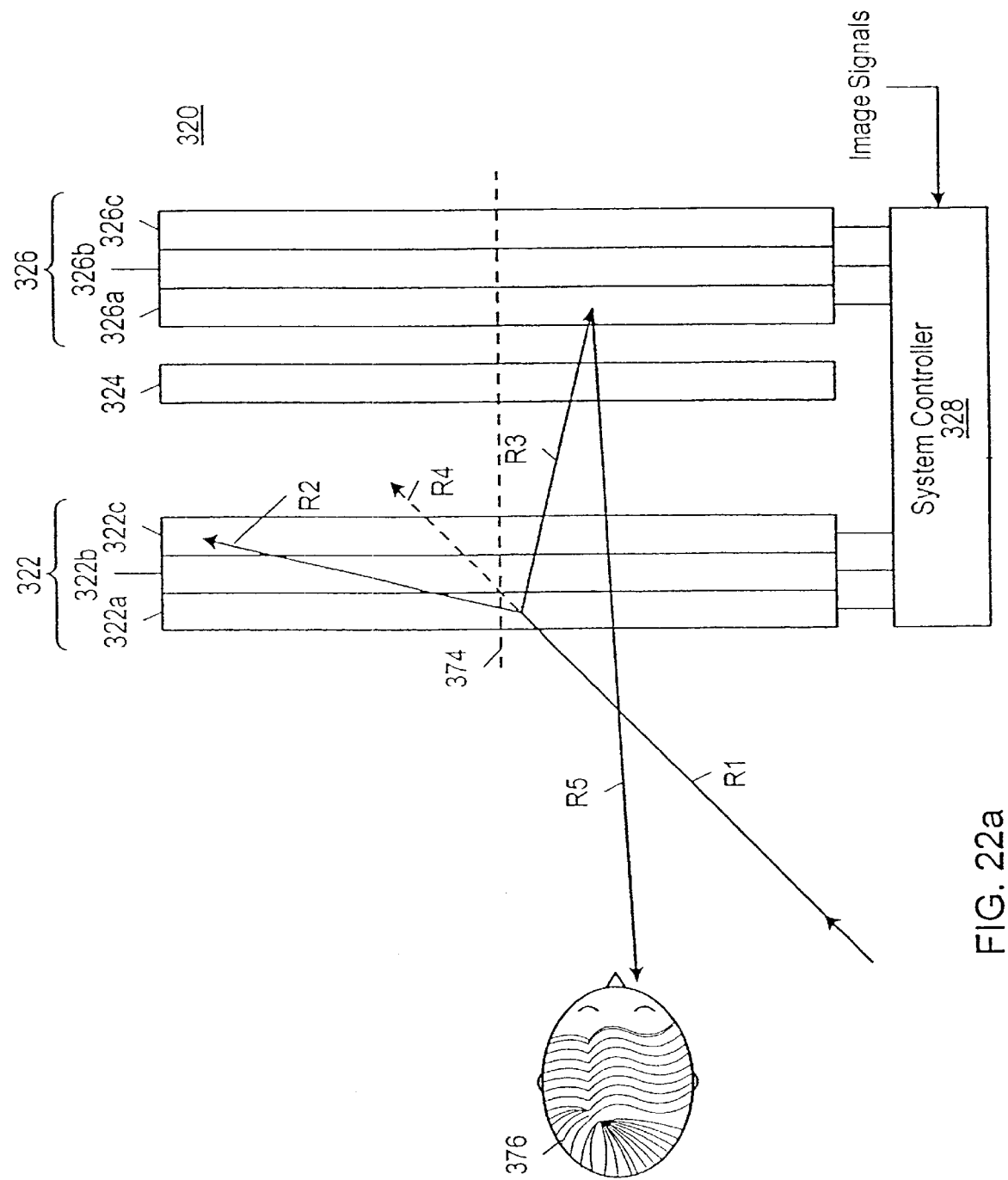
FIGS. 22a–22c are block diagrams showing operational aspects of the optical system and diffractive display system shown in FIG. 18b.
Figure 22B:
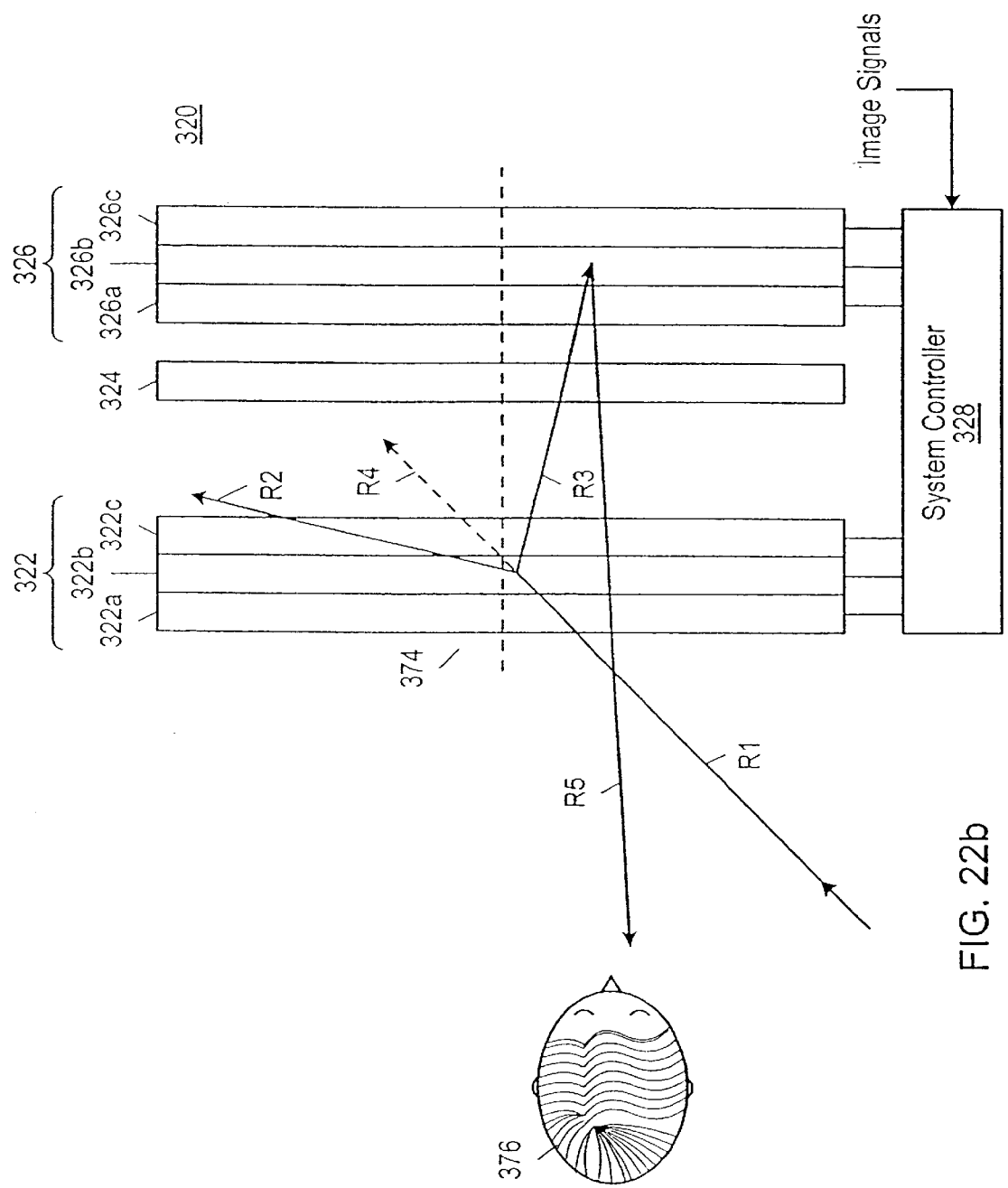
Figure 22C:
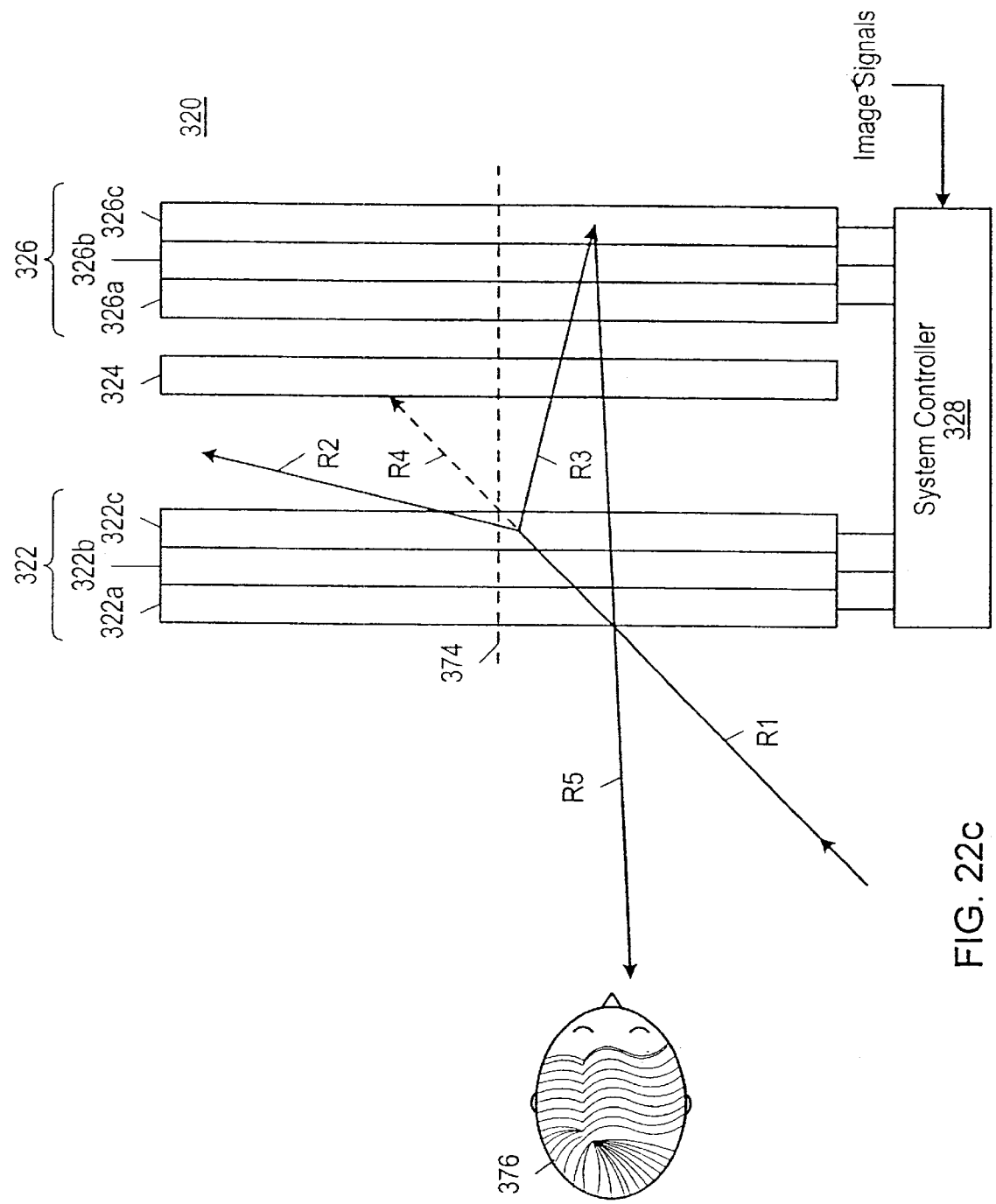

FIGS. 22a–22c illustrate operational aspects of one embodiment of the optical system 320 shown in FIG. 18b. In FIGS. 22a–22c, first optical subsystem 322 comprises three thin phase transmissive switchable holographic optical elements 322a–322c that cyclically and sequentially diffracts red, green, and blue bandwidth light. In one embodiment, each of the optical elements 322a–322c is defined by the structure shown in FIG. 19a. However, first optical subsystem may define a single switchable holographic optical element which simultaneously diffracts red, green, and blue bandwidth light in response to a single activation signal generated by system controller. The first optical subsystem may also comprise a single or three distinct static holographic optical elements that simultaneously and continuously diffract red, green, and blue bandwidth light. The present embodiment will be described with first optical subsystem comprising three switchable holographic optical elements.

The second optical subsystem 326 defines a diffractive display and comprises three volume phase switchable reflective holographic optical elements 326a–326c. Each of the optical elements 326a–326c comprises, in one embodiment, the structure shown in FIGS. 19b and 20. It is noted that system controller 328 can simultaneously activate one or more of the ITO elements 350 (See FIGS. 19b and 20) of one or all three of the optical elements 326a–326c in response to receiving one or three frames of image signals, respectively. The present embodiment will be described with respect to system controller activating one or more of the ITO elements 350 of a one of the optical elements 326a–326c in response to receiving a single frame of image signals. Further, the present embodiment will be described with system controller 328 activating corresponding pairs of optical elements in both the first and second optical subsystems at any one time while deactivating the remaining optical elements. For example, in FIG. 22a optical elements 322a and 326a are activated while the remaining are deactivated, in FIG. 22b optical elements 322b and 326b are activated while the remaining are deactivated, and in FIG. 22c optical elements 322c and 326c are activated while the remaining are deactivated.

The optical element 322a in FIGS. 22a–22c diffracts the p-polarized red bandwidth component of light incident thereon when operating in the active state. Further, optical element 322a passes the remaining components of the incident light without substantial alteration when operating in the active state. In the inactive state, optical element 322a passes substantially all incident light without substantial alteration. Optical element 322b, when operating in the active state, diffracts the p-polarized blue bandwidth component of incident light while passing the remaining components without substantial alteration. In the inactive state, optical element 322b passes substantially all incident light without substantial alteration. Optical element 322c, when activated, diffracts the p-polarized green bandwidth component of incident light while passing the remaining components without substantial alteration. Optical element 322c, in the inactive state, passes substantially all components of incident light without substantial alteration.

Activated subareas of optical element 326a diffract red bandwidth light circularly polarized by quarter wave plate 324 while passing the remaining components of the incident light without substantial alteration. The red bandwidth light diffracted by activated subareas in optical element 326a emerges from the same surface that receives the incident light. Inactive subareas of optical element 326a pass substantially all light incident thereon without substantial alteration. Activated subareas of optical element 326b diffract blue bandwidth light circularly polarized by quarter wave plate 324 while passing the remaining components thereof without substantial alteration. The blue bandwidth light diffracted by optical element 326b emerges from the same surface that receives the incident light. The inactive subareas of optical element 326b pass substantially all incident light without substantial alteration. The activated subareas of optical element 326c diffracts green bandwidth light circularly polarized by quarter wave plate 324 while passing the remaining components thereof without substantial alteration. The diffracted green bandwidth light emerges from the same surface that receives the incident light. Deactivated subareas of optical element 326c pass substantially all incident light without substantial alteration.

The operational aspects of system 320 shown in FIGS. 22a–22c are in many ways similar to that shown in FIGS. 21a–21c. More particularly, the first optical subsystem 322 collects ambient light over a range of incidence angles. In FIG. 22a, system controller 328 activates optical element 322a. Additionally, system controller 328 activates one or more subareas of optical element 326a in response to receiving a frame of image signals. The remaining optical components are rendered inactive by system controller 328. In FIG. 22a, ambient ray R1 comprises the p-polarized red bandwidth component of ambient light. R1, after being received by activated optical element 322a, is diffracted into a zero order beam R4 and first order diffracted beams R2 and R3. The thin phase transmissive type switchable holographic optical elements 322a–322c are designed so that rays, such as R1, with predominantly large incidence angles, are diffracted to give rise to diffractive first order rays, such as R3, that have directions making a small emergence angle with respect to the optical axis 374. Diffracted p-polarized red bandwidth light R3 passes through quarter wave plate 324 and becomes circularly polarized before it is received by an activated or deactivated subarea of optical element 326a. The present embodiment will be described with reference to R3 being received by an activated subarea of optical element 326a. The activated subarea of optical element 326a diffracts R3, the diffracted light R5 emerging from the same surface that receives R3. R5 passes back through quarter wave plate 324 and acquires a polarization state orthogonal to that of R3. In other words, after passing through quarter wave plate 324, R5 will become predominantly s-polarized. R5 passes through optical elements 322a–322c without substantial alteration to be viewed by observer 376.

FIG. 22b shows system 320 of FIG. 22a just after system controller deactivates optical elements 322a and 326a and activates optical element 322b and one or more subareas of optical element 326b. Again, the subareas of optical element 326b are activated by controller 328 in response to controller 328 receiving a frame of image signals. In FIG. 22b, ambient ray R1 comprises the p-polarized blue bandwidth component of ambient light. R1 passes through optical element 322a without substantial alteration. R1, after being received by activated optical element 322b, is diffracted into a zero order beam R4 and first order diffracted beams R2 and R3. Diffracted p-polarized blue bandwidth light R3 passes through quarter wave plate 324 and becomes circularly polarized before it is received by an activated or deactivated subarea of optical element 326b. The present embodiment will be described with reference to R3 being received by an activated subarea of optical element 326b. The activated subarea of optical element 326b diffracts R3, the diffracted light R5 emerging from the same surface that receives R3. R5 passes back through quarter wave plate 324 and acquires a polarization state orthogonal to that of R3. In other words, after passing through quarter wave plate 324, R5 will become predominantly s-polarized. R5 passes through optical elements 322a–322c without substantial alteration to be viewed by observer 376.

FIG. 22c shows system 320 of FIG. 22b just after system controller deactivates optical elements 322b and 326b and activates optical element 322c and one or more subareas of optical element 326c. Again, the subareas of optical element 326c are activated by controller 328 in response to controller 328 receiving a frame of image signals. In FIG. 22c, ambient ray R1 comprises the p-polarized green bandwidth component of ambient light. R1 passes through optical element 322a and 322b without substantial alteration. R1, after being received by activated optical element 322c, is diffracted into a zero order beam R4 and first order diffracted beams R2 and R3. Diffracted p-polarized green bandwidth light R3 passes through quarter wave plate 324 and becomes circularly polarized before it is received by an activated or deactivated subarea of optical element 326c. The present embodiment will be described with reference to R3 being received by an activated subarea of optical element 326c. The activated subarea of optical element 326b diffracts R3, the diffracted light R5 emerging from the same surface that receives R3. R5 passes back through quarter wave plate 324 and acquires a polarization state orthogonal to that of R3. In other words, after passing through quarter wave plate 324, R5 will become predominantly s-polarized. R5 passes through optical elements 322a–322c without substantial alteration to be viewed by observer 376.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. An apparatus comprising:
a fit pair of holographic optical elements electrically switchable between active and inactive states;
wherein a first holographic optical element of the first pair, when operating in the inactive state, is configured to transmit first bandwidth light substantially unaltered;
wherein a second holographic optical element of the first pair, when operating in the inactive state, is configured to transmit first bandwidth light substantially unaltered;
wherein the first holographic optical element, when operating in the active slate, is configured to diffract first bandwidth light;
wherein the second holographic optical element, when operating in the active state, is configured to diffract first bandwidth light received on a first surface thereof, wherein first bandwidth light received on the first surface thereof and subsequently diffracted by the second holographic optical clement, emerges from the first surface thereof, and;
a quarter wave plate positioned between the first and second holographic optical elements of the first pair.

2. The apparatus of claim 1 further comprising:
a second pair of holographic optical elements electrically switchable between active and inactive states;
a third pair of holographic optical elements electrically switchable between active and inactive states;
wherein a first holographic optical element of the second pair, when operating in the inactive state, is configured to transmit second bandwidth light substantially unaltered;
wherein a second holographic optical element of the second pair, when operating in the inactive state, is configured to transmit second bandwidth light substantially unaltered;
wherein a first holographic optical element of the third pair, when operating in the inactive state, is configured to transmit third bandwidth light substantially unaltered;
wherein a third holographic optical element of the third pair, when operating in the inactive state, is configured to transmit third bandwidth light substantially unaltered;
wherein the second holographic optical element of the second pair, when operating in the active state, is configured to diffract second bandwidth light received on a second surface thereof, and wherein the second bandwidth light received on the second surface thereof and diffracted by the second holographic optical element of the second pair, emerges from the second surface thereof;
wherein the second holographic optical element of the third pair, when operating in the active state, is configured to diffract third bandwidth light received on a third surface thereof, and wherein the third bandwidth light received on the third surface thereof and diffracted by the second holographic optical element of the third pair, emerges from the third surface thereof;
wherein the quarter wave plate is positioned between the first and second holographic optical elements of the second pair, and;
wherein the quarter wave plate is positioned between the first and second holographic optical elements of the third pair.

3. The apparatus of claim 1 wherein the first holographic optical element is formed from polymer dispersed liquid crystal material.

4. The apparatus of claim 1 wherein the second holographic optical element is formed from polymer dispersed liquid crystal material.

5. The apparatus of claim 1 wherein the first and second holographic optical elements are formed from polymer dispersed liquid crystal material.

6. The apparatus of claim 1 wherein the first holographic optical element comprises a thin phase hologram recorded in a holographic recording medium.

7. The apparatus of claim 1 wherein the first holographic optical element comprises a volume phase hologram recorded in a holographic recording medium.

8. The apparatus of claim 1 wherein the second holographic optical element comprises a volume phase hologram recorded in a holographic recording medium.

9. The apparatus of claim 1 wherein the first holographic optical element comprises first and second oppositely facing surfaces, wherein the first surface of the first optical element faces the quarter wave plate positioned between the first and second holographic optical elements, wherein the second surface of the second surface of the first optical element is configured to receive first bandwidth light, and wherein first bandwidth light received at the second surface of the first optical element and subsequently diffracted by the first optical element, emerges from the first surface of the first optical element.

10. The apparatus of claim 1 wherein the first holographic optical element comprises first and second oppositely facing surfaces, wherein the first surface of the first optical element faces the quarter wave plate positioned between the first and second holographic optical elements, wherein the first surface of the second surface of the first optical element is configured to receive first bandwidth light, and wherein first bandwidth light received at the first surface of the first optical element and subsequently diffracted by the first optical element, emerges from the first surface of the first optical element.

11. The apparatus of claim 1 further comprising a control circuit and a voltage source, wherein the control circuit is configured to selectively couple the voltage source to the first and second holographic optical elements, wherein the first and second holographic optical elements operate in the inactive state when coupled to the voltage source, and wherein the first and second holographic optical elements operate in the active state when coupled to the voltage source.

12. The apparatus of claim 1 further comprising an image display, wherein diffracted light transmitted through the first holographic optical element illuminates the image display.

13. The apparatus of claim 1 wherein the first holographic optical element comprises a layer of material that records a hologram and at least one layer of electrically conductive material positioned adjacent the layer of material that records the hologram.

14. The apparatus of claim 1 wherein the first holographic optical element comprises a layer of material that records a hologram and a pair of layers of electrically conductive material, wherein the layer of material that records the hologram is contained between the pair of layers of electrically conductive material.

15. The apparatus of claim 1 wherein the second holographic optical element comprises a layer of material that records a hologram and at least one layer of electrically conductive material positioned adjacent the layer of material that records the hologram.

16. The apparatus of claim 1 wherein the second holographic optical element comprises a layer of material that records a hologram and a pair of layers of electrically conductive material, wherein layer of material that records the hologram is contained between the pair of layers of electrically conductive material.

17. The apparatus of claim 1 wherein the second holographic optical element comprises a layer of material that records a hologram and an array of electrically conductive elements, wherein the array of electrically conductive elements is positioned adjacent the layer of material that records the hologram.

18. The apparatus of claim 2 further comprising a control circuit and a voltage source wherein the control circuit is configured to selectively couple the voltage source to each of the first and second holographic optical elements of the first, second, and third pairs of holographic optical elements wherein each of the first, second, and third pairs of holographic optical elements operate in the inactive state when coupled to the voltage source, and wherein each of the first, second, and third pairs of holographic optical elements operates in the active state when coupled to the voltage source.

19. The apparatus of claim 13 wherein the at least one layer of electrically conductive material comprises indium tin oxide (ITO).

20. The apparatus of claim 13 wherein the at least one layer of electrically conductive material is configured to be selectively coupled to a voltage source, wherein the first holographic optical element operates in the inactive state when the at least one layer of electrically conductive material of the first holographic optical element is coupled to the voltage source, and wherein the first holographic optical element operates in the active state when the at least one layer of electrically conductive material of the first holographic optical element is not coupled to the voltage source.

21. The apparatus of claim 14 wherein each layer of electrically conductive material comprises indium tin oxide (ITO).

22. The apparatus of claim 15 wherein the at least one layer of electrically conductive material comprises indium tin oxide (ITO).

23. The apparatus of claim 16 wherein each layer of electrically conductive material comprises indium tin oxide (ITO).

24. The apparatus of claim 15 wherein the at least one layer of electrically conductive material is configured to be selectively coupled to a voltage source, wherein the second holographic optical element operates in the inactive state when the at least one layer of electrically conductive material of the second holographic optical element is coupled to the voltage source, and wherein the second holographic optical element operates in the active state when the at least one layer of electrically conductive material of the second holographic optical element is not coupled to the voltage source.

25. The apparatus of claim 17 further comprising a control circuit and a voltage source, wherein the control circuit is configured to selectively couple the voltage source to one or more of the electrically conductive elements.

26. The apparatus of claim 17 wherein each electrically conductive element in the array comprises indium tin oxide (ITO).

27. The apparatus of claim 25 wherein the control circuit is configured to couple the voltage to a first set of electrically conductive elements while a second set of electrically conductive elements are decoupled from the voltage source.

28. The apparatus of claim 25 wherein the control circuit selectively couples the voltage source to one or more of the electrically conductive elements in response to the control circuit receiving image signals.

29. An apparatus comprising:
   a first pair of holographic optical elements each having a first surface aligned on a common axis so that the fist surfaces face each other;

a quarter wave plate aligned with the first surfaces of the first pair of holographic optical elements and positioned between the first pair of holographic optical elements;

wherein a fast holographic optical element of the first pair is configured to diffract first bandwidth light;

wherein a second holographic optical element of the first pair is configured to diffract first bandwidth light;

wherein the second holographic optical clement is configured to diffract first bandwidth light received on a first surface thereof, wherein first bandwidth light received on the first surface thereof and subsequently diffracted by the second holographic optical element, emerges from the fast surface thereof;

wherein the first holographic optical element is switchable between active and inactive state, wherein the first holographic optical element is configured to transmit first bandwidth light substantially unaltered when operating in the inactive state, and wherein the first holographic optical element is configured to diffract first bandwidth light when operating in the active state, and;

wherein the second holographic optical element is switchable between active and inactive states, wherein the second holographic optical element is configured to transmit first bandwidth light substantially unaltered when operating in the inactive state, and wherein the second holographic optical clement, when operating in the active state, is configured to diffract first bandwidth light received on the first surface thereof wherein first bandwidth light received on the first surface thereof and subsequently diffracted by the second holographic optical element, emerges from the first surface thereof.

30. The apparatus of claim 29 wherein the first holographic optical element is configured to transmit light, other than first bandwidth light, without substantial alteration and wherein the second holographic optical element is configured to transmit light, other than first bandwidth light, without substantial alteration.

31. The apparatus of claim 29 wherein the second holographic optical element is switchable between active and inactive states, wherein the second holographic optical element is configured to transmit first bandwidth light substantially unaltered when operating in the inactive state, and wherein the second holographic optical element, when operating in the active state, is configured to diffract first bandwidth light received on the first surface thereof, wherein first bandwidth light received on the first surface thereof and subsequently diffracted by the second holographic optical element, emerges from the first surface thereof.

32. The apparatus of claim 29 wherein the first holographic optical element is switchable between active and inactive states, wherein the first holographic optical element is configured to transmit first bandwidth light substantially unaltered when operating in the inactive state, and wherein the first holographic optical element is configured to diffract first bandwidth light when operating in the active state.

33. The apparatus of claim 29 further comprising:

a second pair of holographic optical elements electrically switchable between active and inactive states;

a third pair of holographic optical elements electrically switchable between active and inactive states;

wherein a first holographic optical element of the second pair, when operating in the inactive state, is configured to transmit second bandwidth light substantially unaltered;

wherein a second holographic optical element of the second pair, when operating in the inactive state, is configured to diffract second bandwidth light substantially unaltered;

wherein a first holographic optical element of the third pair, when operating in the inactive state, is configured to transmit third bandwidth light substantially unaltered;

wherein a third holographic optical element of the third pair, when operating in the inactive state, is configured to transmit third bandwidth light substantially unaltered;

wherein the second holographic optical clement of the second pair, when operating in the active state, is configured to diffract second bandwidth light received on a second surface thereof, and wherein the second bandwidth light received on the second surface thereof and diffracted by the second holographic optical element of the second pair, emerges from the second surface thereof;

wherein the second holographic optical element of the third pair, when operating in the active state, is configured to diffract third bandwidth light received on a third surface thereof, and wherein the third bandwidth light received on the third surface hereof and diffracted by the second holographic optical element of the third pair, emerges from the third surface thereof;

wherein the quarter wave plate is positioned between the first and second holographic optical elements of the second pair, and;

wherein the quarter wave plate is positioned between the first and second holographic optical elements of the third pair.

34. The apparatus of claim 29 wherein the first holographic optical element is formed from polymer dispersed liquid crystal material.

35. The apparatus of claim 29 wherein the second holographic optical element is formed from polymer:r dispersed liquid crystal material.

36. The apparatus of claim 29 wherein the first and second holographic optical elements are formed from polymer dispersed liquid crystal material.

37. The apparatus of claim 29 wherein the first holographic optical element comprises a thin phase hologram recorded in a holographic recording medium.

38. The apparatus of claim 29 wherein the first holographic optical clement comprises a volume phase hologram recorded in a holographic recording medium.

39. The apparatus of claim 29 wherein the second holographic optical element comprises a volume phase hologram recorded in a holographic recording medium.

40. The apparatus of claim 29 wherein the first holographic optical element comprises first and second oppositely facing surfaces, wherein the first surface: of the first optical element faces the quarter wave plate positioned between the first and second holographic optical elements, wherein the second surface of the second surface of the first optical element is configured to receive first bandwidth light, and wherein first bandwidth light received at the second surface of the first optical element and subsequently diffracted by the first optical element: emerges from the first surface of the first optical element.

41. The apparatus of claim 29 where the first holographic optical element comprises first and second oppositely facing surfaces, wherein the first surface of the first optical element faces the quarter wave plate positioned between the first and second holographic optical elements, wherein the first surface of the second surface of the first optical element is configured to receive first bandwidth light, and wherein first bandwidth light received at the first surface of the first optical element and subsequently diffracted by the first optical element emerges from the first surface of the first optical element.

42. The apparatus of claim 29 further comprising a control circuit and a voltage source, wherein the control circuit is configured to selectively couple the voltage source to the first and second holographic optical elements, wherein the first and second holographic optical elements operate in the inactive state when coupled to the voltage source, and wherein the first and second holographic optical elements operate in the active state when coupled to the voltage source.

43. The apparatus of claim 29 further comprising a control circuit and a voltage source wherein the control circuit is configured to selectively couple the voltage source to each of the first and second holographic optical elements of the first, second, and third pairs of holographic optical elements wherein each of the first, second, and third pairs of holographic optical elements operate in the inactive state when coupled to the voltage source, and wherein each of the first, second, and third pairs of holographic optical elements operates in the active state when coupled to the voltage source.

44. The apparatus of claim 29 wherein the first holographic optical element comprises a layer of material that records a hologram and at least one layer of electrically conductive material positioned adjacent the layer of material that records the hologram.

45. The apparatus of claim 29 wherein the first holographic optical element comprises a layer of material that records a hologram and a pair of layers of electrically conductive material, wherein the layer of material that records the hologram is contained between the pair of layers of electrically conductive material.

46. The apparatus of claim 29 wherein the second holographic optical element comprises a layer of material that records a hologram and at least one layer of electrically conductive material positioned adjacent the layer of material that records the hologram.

47. The apparatus of claim 29 wherein the second holographic optical element comprises a layer of material that records a hologram and a pair of layers of electrically conductive material, wherein layer of material that records the hologram is contained between the pair of layers of ilectrically conductive material.

48. The apparatus of claim 29 wherein the second holographic optical element comprises a layer of material that records a hologram and an array of electrically conductive elements, wherein the array of electrically conductive elements is positioned adjacent the layer of material that records the hologram.

49. The apparatus of claim 29 further comprising an image display, wherein diffracted light transmitted through the first holographic optical element illuminates the image display.

50. The apparatus of claim 30 further comprising a quarter wave plate aligned with the first surfaces of the first pair of holographic optical elements and positioned between the first pair of holographic optical elements.

51. The apparatus of claim 44 wherein each electrically conductive element in the array comprises indium tin oxide (ITO).

52. The apparatus of claim 45 wherein the at least one layer of electrically conductive material comprises indium tin oxide (ITO).

53. The apparatus of claim 46 wherein each layer of electrically conductive material comprises indium tin oxide (ITO).

54. The apparatus of claim 46 wherein the at least one layer of electrically conductive material is configured to be selectively coupled to a voltage source, wherein the first holographic optical element operates in the inactive state when the at least one layer of electrically conductive material of the first holographic optical element is coupled to the voltage source, and wherein the first holographic optical element operates in the active state when the at least one layer of electrically conductive material of the first holographic optical element is not coupled to the voltage source.

55. The apparatus of claim 46 wherein the at least one layer of electrically conductive material is configured to be selectively coupled to a voltage source, wherein the second holographic optical element operates in the inactive state when the at least one layer of electrically conductive material of the second holographic optical element is coupled to the voltage source, and wherein the second holographic optical element operates in the active state when the at least one layer of electrically conductive material of the second holographic optical element is not coupled to the voltage source.

56. The apparatus of claim 47 wherein the at least one layer of electrically conductive material comprises indium tin oxide (ITO).

57. The apparatus of claim 48 further comprising a control circuit and a voltage source, wherein the control circuit is configured to selectively couple the voltage source to one or more of the electrically conductive elements.

58. The apparatus of claim 48 wherein each layer of electrically conductive material comprises indium tin oxide (ITO).

59. The apparatus of claim 57 wherein the control circuit is configured to couple the voltage to a first set of electrically conductive elements while a second set of electrically conductive elements are decoupled from the voltage source.

60. The apparatus of claim 57 wherein the control circuit selectively couples the voltage source to one or more of the electrically conductive elements in response to the control circuit receiving image signals.

61. A method comprising:
    diffracting a first bandwidth light incident on a first optical element of a first pair of optical elements to produce a first diffracted light;
    passing the first diffracted light through a quarter wave plate to produce a polarized light;
    diffracting the polarized light using a second optical element of the first pair of optical elements to produce a second diffracted light;
    passing the second diffracted light through the quarter wave plate, and;
    transmitting the second diffracted light through the first optical element without substantial alteration after the second diffracted light passes through the quarter wave plate;
    wherein the quarter wave plate is positioned between the first and second optical elements.

62. The method of claim 61 further comprising:
    activating the first and second optical elements prior to the first optical element diffracting the first bandwidth light incident thereon and prior to the second optical element diffracting the polarized light, and;
    deactivating the first and second optical elements after the first optical element diffracts the first bandwidth light incident thereon and after to the second optical element diffracts the polarized light, and;

transmitting first bandwidth light through the first optical element without substantial alteration while the first optical element is deactivated thereby producing a first transmitted light;

passing the first transmitted light through the quarter wave plate to produce a second polarized light, and;

transmitting the second polarized light through the second optical element without substantial alteration while the second optical element is deactivated.

63. The method of claim 61 further comprising:

the first optical element receiving the first bandwidth light prior to the first optical element diffracting the first bandwidth light, wherein the first bandwidth light is received on a surface of the first optical element at a first angle measured with respect to an optical axis, wherein the optical axis is normal to the surface of the first optical element, and;

the second diffracted light transmitted through the first optical element emerging from the surface at a second angle measured with respect to the optical axis:

wherein the first angle is greater than the second angle.

64. The method of claim 62 wherein activating the first and second optical elements comprises coupling the first and second optical elements to a voltage source, and wherein deactivating the first and second optical elements comprises decoupling the first and second optical elements to a voltage source.

65. The method of claim 64 further comprising illuminating an image display with the second diffracted light transmitted through the first optical element.

66. The method of claim 64 further comprising activating first and second optical elements of a second pair of optical elements after deactivating the first and second optical elements of the first pair of optical elements;

diffracting a second bandwidth light incident on a first optical element of the second pair of optical elements to produce a third diffracted light;

passing the third diffracted light through a quarter wave plate to produce a second polarized light;

diffracting the second polarized light using the second optical element of the second pair of optical elements to produce a fourth diffracted light;

passing the fourth diffracted light through the quarter wave plate, and;

transmitting the fourth diffracted light through the first optical element of the second pair of optical elements without substantial alteration after the fourth diffracted light passes through the quarter wave plate;

wherein the quarter wave plate is positioned between the first and second optical elements of the second pair of optical elements.

* * * * *